(12) United States Patent
Ishiwata

(10) Patent No.: US 9,041,788 B2
(45) Date of Patent: May 26, 2015

(54) METHOD AND APPARATUS FOR VISUALIZING PHASE OBJECT

(75) Inventor: Hiroshi Ishiwata, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 873 days.

(21) Appl. No.: 13/221,581

(22) Filed: Aug. 30, 2011

(65) Prior Publication Data

US 2012/0057013 A1    Mar. 8, 2012

(30) Foreign Application Priority Data

Sep. 3, 2010 (JP) .................................. 2010-198304
Aug. 3, 2011 (JP) .................................. 2011-170502

(51) Int. Cl.
*H04N 7/18* (2006.01)
*G02B 21/36* (2006.01)

(52) U.S. Cl.
CPC ................................... *G02B 21/367* (2013.01)

(58) Field of Classification Search
CPC ................................................... G02B 21/367
See application file for complete search history.

(56) References Cited

U.S. PATENT DOCUMENTS

| | | | |
|---|---|---|---|
| 5,751,475 A | 5/1998 | Ishiwata et al. | |
| 7,564,622 B2 | 7/2009 | Ishiwata | |
| 2006/0238711 A1* | 10/2006 | Kitajima | 351/214 |
| 2008/0259345 A1* | 10/2008 | Fukutake | 356/450 |
| 2009/0032732 A1* | 2/2009 | Konishi et al. | 250/458.1 |

FOREIGN PATENT DOCUMENTS

| | | |
|---|---|---|
| JP | 7-225341 A | 8/1995 |
| JP | 8-122648 A | 5/1996 |
| JP | 09197289 A | 7/1997 |
| JP | 2003131139 A | 5/2003 |
| JP | 2003173288 A | 6/2003 |
| JP | 2004-354650 A | 12/2004 |
| JP | 2005-173288 A | 6/2005 |

OTHER PUBLICATIONS

C. J. R. Sheppard and T. Wilson, "Fourier Imaging of Phase Information in Scanning and Conventional Optical Microscopes", Philosophical Transactions of the Royal Society of London, U.K., Royal Society, Vo. 295, No. 1415, pp. 513-536, (Feb. 7, 1980).

Shojiro Kawakami, "Industrial Applications of Stacked Photonic Crystal", Applied Physics, vol. 77(5), (2008) (and partial English translation thereof).

Japanese Office Action dated Jan. 27, 2015, issued in counterpart Japanese Application No. 2011-170502.

* cited by examiner

*Primary Examiner* — Dave Czekaj
*Assistant Examiner* — Md Haque
(74) *Attorney, Agent, or Firm* — Holtz, Holtz, Goodman & Chick PC

(57) ABSTRACT

A visualization apparatus includes a light source, an illumination optical system configured to guide light from the light source to an observation target object, an image forming optical system configured to form an optical image of the observation target object on an image plane, an image pickup element arranged on the image plane, a calculation device configured to calculate a plurality of first electronic images of the observation target object obtained from the image pickup element to generate a second electronic image, and an oblique illumination control section configured to control an illumination direction of oblique illumination provided by the illumination optical system. The plurality of first electronic images include first electronic images of the observation target object illuminated from different illumination directions by the oblique illumination control section.

15 Claims, 24 Drawing Sheets

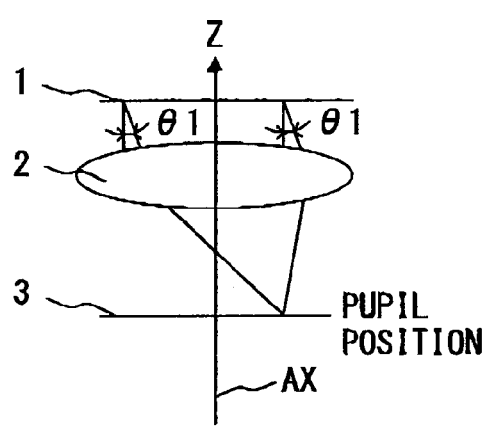
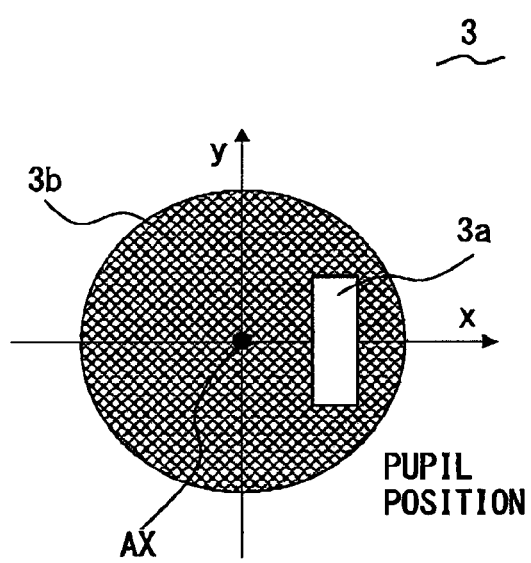
F I G. 4 A
F I G. 4 B

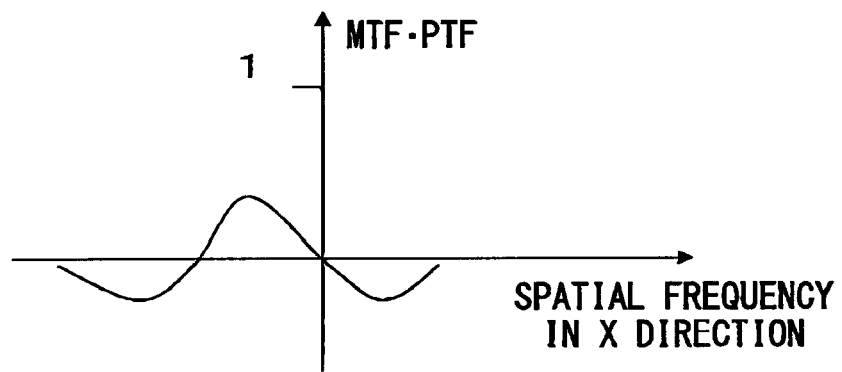
F I G. 6

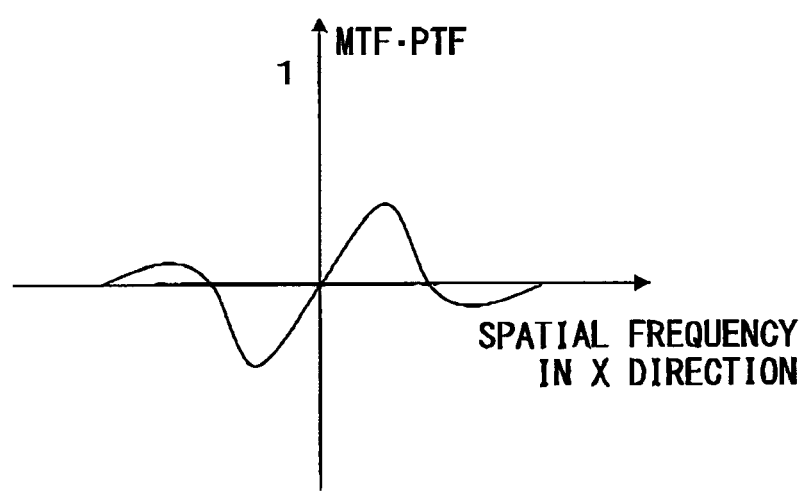
F I G. 7

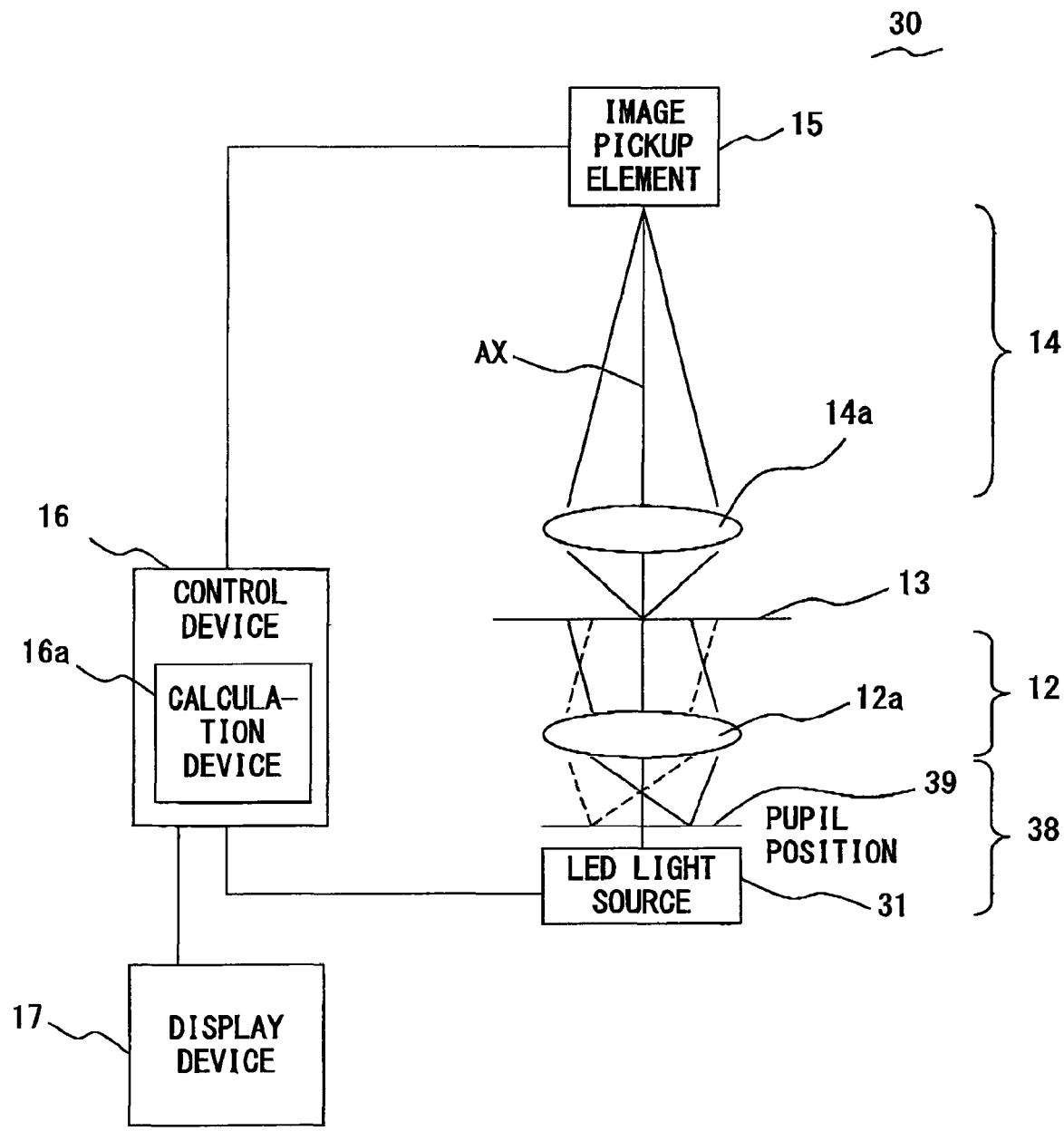
F I G. 1 0

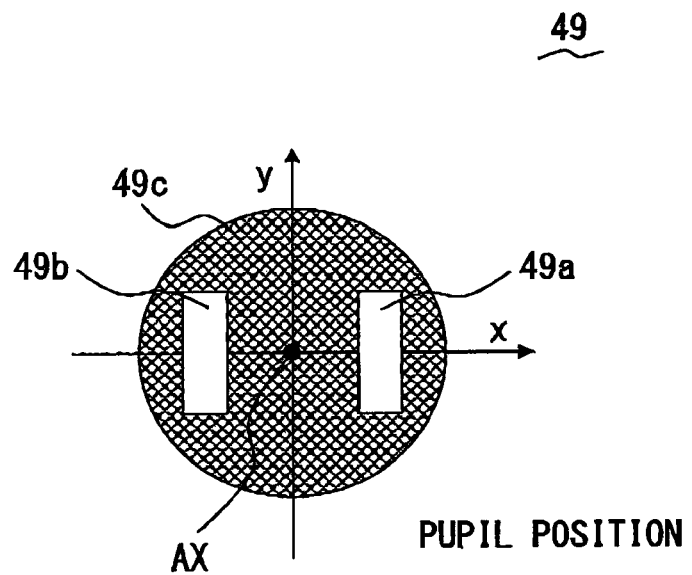
F I G. 1 3

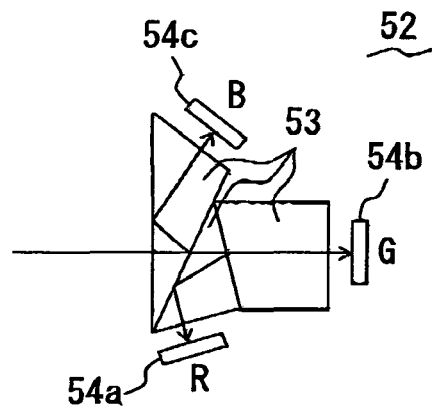
F I G. 1 4 A          F I G. 1 4 B

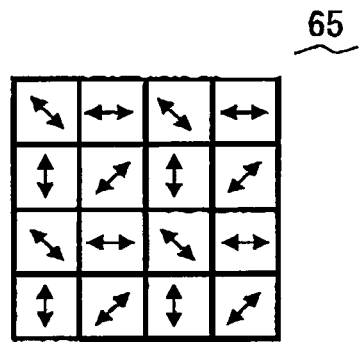
F I G. 16

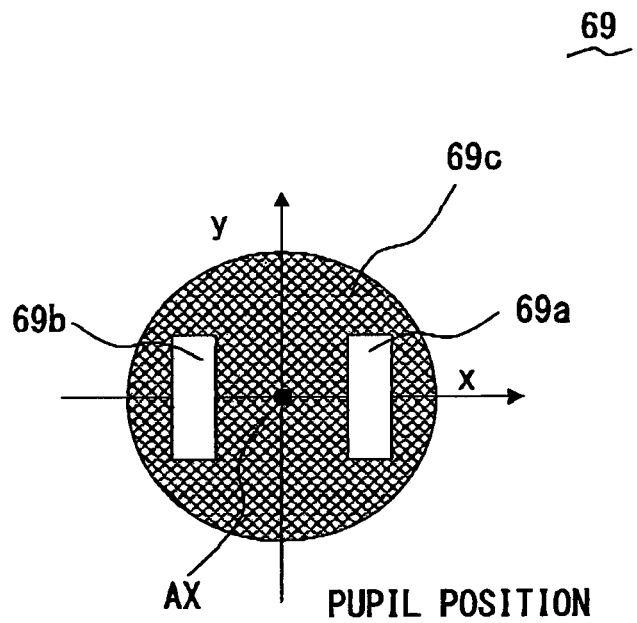
F I G. 17

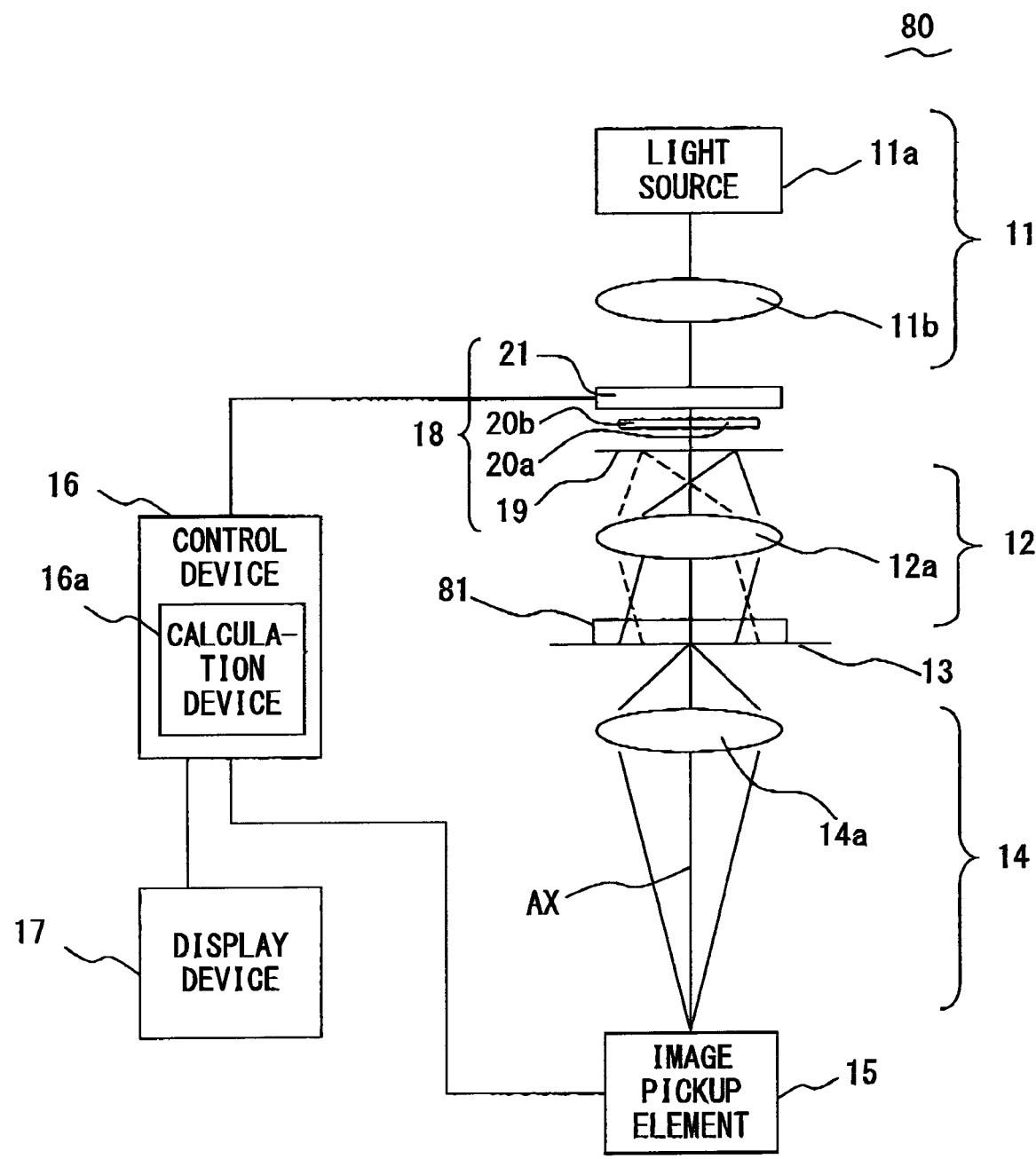
F I G. 1 8

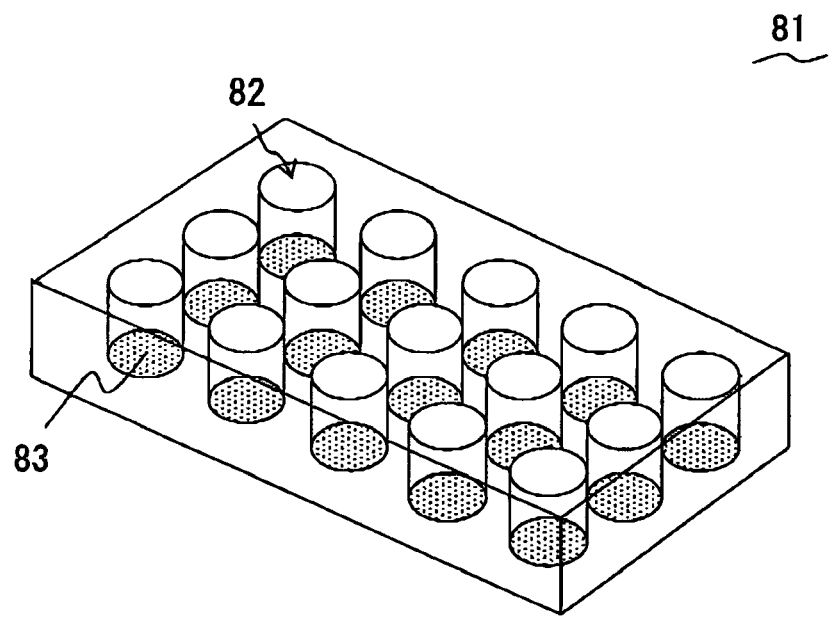
F I G. 1 9 A
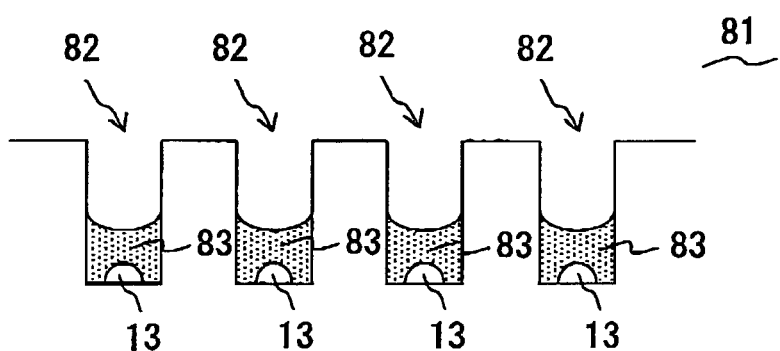
F I G. 1 9 B

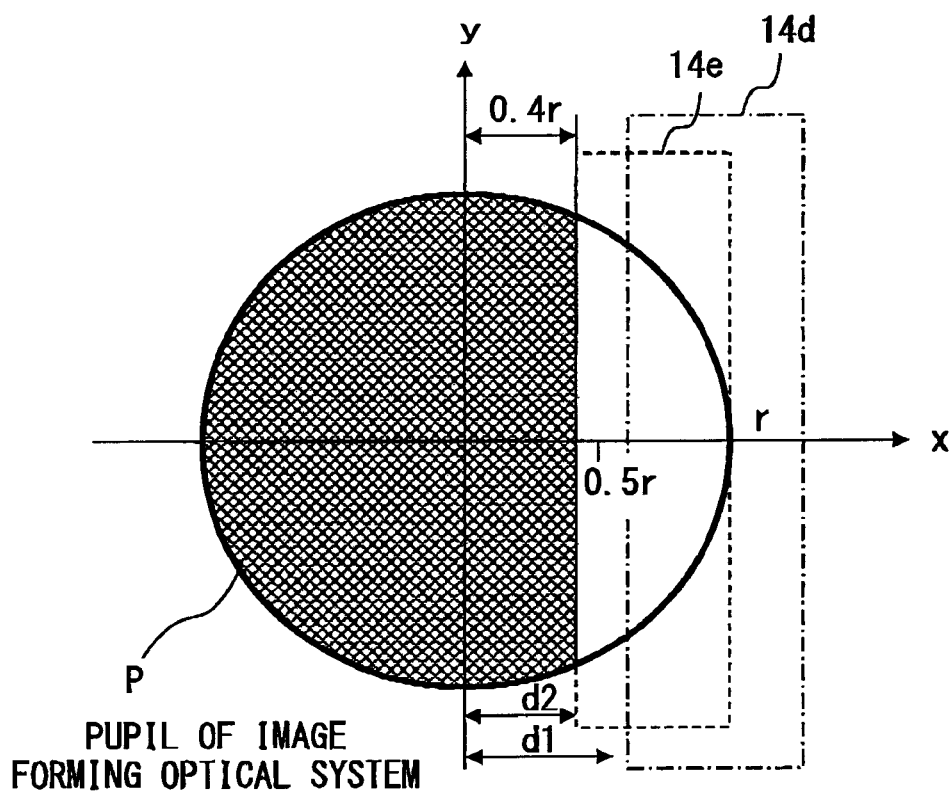
F I G. 2 4

METHOD AND APPARATUS FOR VISUALIZING PHASE OBJECT

CROSS REFERENCE TO RELATED APPLICATIONS

This application is based upon and claims the benefit of priority from the prior Japanese Patent Applications Nos. 2011-170502, filed Aug. 3, 2011, and 2010-198304, filed Sep. 3, 2010, the entire contents of which are incorporated herein by these references.

BACKGROUND OF THE INVENTION

1. Field of the Invention

The present invention relates to a method for visualizing a phase object such as cultured cells, body tissues, and very small steps on a metal surface, and a visualization apparatus for the phase object.

2. Description of the Related Art

Cultured cells and body tissues (hereinafter collectively referred to as body specimens) are each a phase object causing a phase difference in light as a result of a difference in refractive index between the body specimen itself and a surrounding medium, the distribution of refractive index of the body specimen, or the shape of the body specimen.

Phase objects such as body specimens are conventionally observed using a special microscope such as a phase contrast microscope or a differential interference contrast microscope which visualizes the phase distribution of the phase object. A phase contrast microscope is disclosed in, for example, Japanese Patent Laid-Open No. 7-225341 Furthermore, a differential interference contrast microscope is disclosed in, for example, Japanese Patent Laid-Open No. 8-122648.

In recent years, with prevalence of fluorescent microscopes, phase objects have been commonly observed using both fluorescent observation and phase contrast observation or differential interference contrast observation. Specifically, a site of the phase object to be analyzed is identified using images obtained by the phase contrast observation or the differential interference contrast observation (these images are hereinafter referred to as phase distribution images). The site is analyzed in detail using fluorescent images obtained by the fluorescent observation.

In general, fluorescence involved in the fluorescent observation is generally faint. Thus, an image forming optical system of the microscope needs to have a high transmissivity.

However, if both the phase contrast observation and the fluorescent observation are used, a ring slit is formed at a pupil position in a condenser lens for the phase contrast observation. A phase plate is provided at a position where the phase plate is conjugate to a ring slit in an objective. Thus, the phase plate absorbs fluorescence, reducing the transmissivity of the objective, included the image forming optical system.

Furthermore, if both the differential interference contrast observation and the fluorescent observation are used, then for the differential interference contrast observation, a polarizer and a Nomarski prism are arranged in an illumination optical system, and a polarizer and a Nomarski prism are arranged in the image forming optical system, with the two polarizers set to a crossed Nichol state. Thus, the polarizer and Nomarski prism in the image forming optical system act to reduce the transmissivity of the image forming optical system.

To avoid a decrease in the transmissivity of the image forming optical system caused by the optical elements not required for the fluorescent observation, it is conceivable to adopt a configuration in which an observation optical path for the phase contrast observation or the differential interference contrast observation is separated from an observation optical path for the fluorescent observation.

However, in this case, separate optical elements and relay optical systems are required to separate the observation optical paths from each other (or synthesize the observation optical paths with each other). As a result, the added optical elements pose new problems: the transmissivity of the image forming optical system may decrease or the configuration of the image forming optical system may be complicated.

As described above, in the microscope that uses both the fluorescent observation and the phase contrast observation or differential interference contrast observation, preventing a decrease in the transmissivity of the image forming optical system with respect to fluorescence is very difficult.

Effective techniques for such a technical problem are disclosed in C. J. R. Sheppard, T. Wilson, Fourier imaging of phase information in scanning and conventional optical microscopes, PHILOSOPHICAL TRANSACTIONS OF THE ROYAL SOCIETY OF LONDON, Great Britain, ROYAL SOCIETY, Feb. 7, 1980, Vol. 295, No. 1415, pp. 513-536 (hereinafter referred to as Non-Patent Document 1), Japanese Patent laid-Open No. 2004-354650, and Japanese Patent Laid-Open No. 2005-173288.

Non-Patent Document 1 discloses a technique to displace a phase object from a focused position to allow the phase object to be observed in a defocus state, thus providing an image intensity distribution corresponding to the phase distribution of the phase object. The technique disclosed in Non-Patent Document 1 can provide the image intensity distribution corresponding to the phase distribution of the phase object, and thus a corresponding phase distribution image, without the need to arrange, in the image forming optical system, optical elements required for the phase contrast observation or the differential interference contrast observation. This prevents a possible decrease in the transmissivity of the image forming optical system. Hence, the technique is suitable for the use of the phase contrast observation or differential interference contrast observation together with the fluorescent observation.

Furthermore, Japanese Patent Laid-Open No. 2004-354650 and Japanese Patent Laid-Open No. 2005-173288 disclose techniques to displace a phase object forward and backward from a focused position to allow two images acquired in the respective defocus states and then to calculate the difference between the two images to generate a phase distribution image with a high contrast. The techniques disclosed in Japanese Patent Laid-Open No. 2004-354650 and Japanese Patent Laid-Open No. 2005-173288 can provide phase distribution images with a higher contrast than those obtained by the technique disclosed in Non-Patent Document 1. Furthermore, like the technique disclosed in Non-Patent Document 1, the techniques disclosed in Japanese Patent Laid-Open No. 2004-354650 and Japanese Patent Laid-Open No. 2005-173288 eliminate the need for the optical elements required in the image forming optical system for the phase contrast observation or the differential interference contrast observation. This prevents a possible decrease in the transmissivity of the image forming optical system. Thus, the techniques disclosed in Japanese Patent Laid-Open No. 2004-354650 and Japanese Patent Laid-Open No. 2005-173288 are suitable for the use of the fluorescent observation together with the phase contrast observation or differential interference contrast observation.

As described above, phase distribution images are used mainly for identification of a site of a phase object to be analyzed, that is, an operation called screening. Thus, the phase distribution image needs to have a sufficient contrast to allow the analysis target site to be identified as well as a high real-time property that allows shift of an observation field of view to be followed.

SUMMARY OF THE INVENTION

An aspect of the present invention provides a visualization method including a step of illuminating an observation target object in an oblique illumination to acquire a plurality of first electronic images of the observation target image illuminated from different illumination directions and a step of calculating the plurality of first electronic images to generate a second electronic image.

Another aspect of the present invention provides a visualization apparatus including a light source, an illumination optical system configured to guide light from the light source to an observation target object, an image forming optical system configured to form an optical image of the observation target object on an image plane, an image pickup element arranged on the image plane, a calculation device configured to calculate a plurality of first electronic images of the observation target object obtained from the image pickup element to generate a second electronic image, and an oblique illumination control section configured to control an illumination direction of oblique illumination provided by the illumination optical system, wherein the plurality of first electronic images include first electronic images of the observation target object illuminated from different illumination directions by the oblique illumination control section.

BRIEF DESCRIPTION OF THE DRAWINGS

The present invention will be more apparent from the following detailed description when the accompanying drawings are referenced.

FIG. 4A is a schematic side view of an illumination optical system and an oblique illumination section, illustrating an oblique illumination method for illuminating an observation target object in an oblique illumination from a second illumination direction;

FIG. 4B is a top view of the oblique illumination section, illustrating the oblique illumination method for illuminating the observation target object in an oblique illumination from the second illumination direction;

FIG. 6 is a diagram illustrating the product of the X-directional MTF and PTF of the image forming optical system obtained when the observation target object is illuminated in an oblique illumination from the second illumination direction;

FIG. 7 is a diagram illustrating the result of calculation of the difference between the product of the MTF and PTF illustrated in FIG. 3 and the product of the MTF and PTF illustrated in FIG. 6;

FIG. 10 is a diagram illustrating a configuration of a microscope apparatus according to Embodiment 2;

FIG. 13 is a top view of an oblique illumination section included in the microscope apparatus illustrated in FIG. 12;

FIG. 14A is a diagram illustrating a single-shot color CCD included in the microscope apparatus illustrated in FIG. 12;

FIG. 14B is a diagram illustrating a three-shot color CCD included in the microscope apparatus illustrated in FIG. 12;

FIG. 16 is a diagram illustrating a configuration of a polarization camera included in the microscope apparatus illustrated in FIG. 15;

FIG. 17 is a top view of an oblique illumination section included in the microscope apparatus illustrated in FIG. 15;

FIG. 18 is a diagram illustrating a configuration of a microscope apparatus according to Embodiment 5;

FIG. 19A is a perspective view illustrating a multi-well plate used for observation carried out by the microscope apparatus illustrated in FIG. 18;

FIG. 19B is a cross-sectional view illustrating the multi-well plate used for the observation carried out by the microscope apparatus illustrated in FIG. 18;

FIG. 24 is a diagram illustrating a change in aperture image resulting from a concave lens action of the surface of a solution.

DESCRIPTION OF THE PREFERRED EMBODIMENTS

Figure 1A:
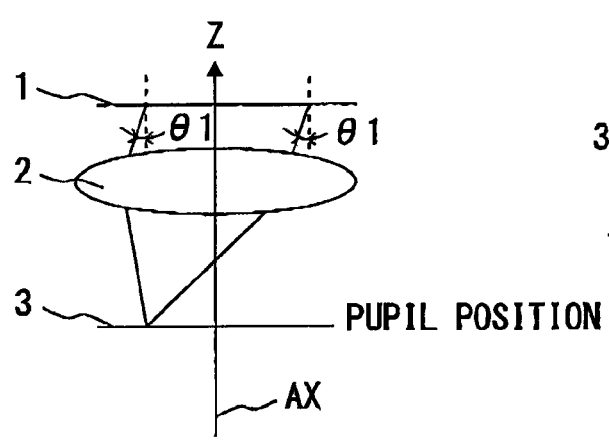
FIG. 1A is a schematic side view of an illumination optical system and an oblique illumination section, illustrating an oblique illumination method for illuminating an observation target object in an oblique illumination from a first illumination direction.

A method for visualizing a phase object according to each embodiment of the present invention will be described in brief.

The visualization method according to each embodiment of the present invention includes a step of illuminating an observation target object that is a phase object in an oblique illumination to acquire a plurality of phase distribution images (hereinafter referred to as first electronic images) of the observation target image illuminated from different illumination directions, and a step of calculating the plurality of first electronic images obtained in the first step to generate a new phase distribution image (hereinafter referred to as a second electronic image).

The visualization method according to each embodiment of the present invention is similar to the techniques disclosed in Non-Patent Document 1, Japanese Patent Laid-Open No 2004-354650, and Japanese Patent Laid-Open No. 2005-173288 in that a phase object is visualized by causing a phase difference in observation light utilizing a wavefront aberration on a pupil plane which occurs when the phase object is observed in a defocus state.

Furthermore, the visualization method according to each embodiment of the present invention is similar to the techniques disclosed in Japanese Patent Laid-Open No. 2004-354650, and Japanese Patent Laid-Open No. 2005-173288 in that a plurality of phase distribution images acquired with the wavefront aberration varied are utilized to generate a phase distribution image with a higher contrast than those obtained by the technique disclosed in Non-Patent Document 1.

However, the visualization method according to each embodiment of the present invention is different from the techniques disclosed in Japanese Patent Laid-Open No. 2004-354650 and Japanese Patent Laid-Open No. 2005-17328 in that whereas the techniques disclosed in Japanese Patent Laid-Open No. 2004-354650 and Japanese Patent Laid-Open No. 2005-17328 use phase distribution images obtained with the phase object displaced forward and backward from a focused position to generate a phase distribution image with a high contrast, the present visualization method uses phase distribution images (first electronic images) of the phase object illuminated in an oblique illumination from different illumination directions to generate a phase distribution image with a high contrast (second electronic image).

For example, the illumination direction of the oblique illumination can be switched at a high speed by such a method as described below in the embodiments. Alternatively, a plurality of phase distribution images in different illumination directions (first electronic images) can be acquired without the need for a switching operation. Thus, the visualization method according to each embodiment of the present invention can acquire a plurality of phase distribution images (first electronic images) at a higher speed than the forward and backward shift of phase object from the focused position. Thus, a phase distribution image (second electronic image) with a high contrast can be generated at a high speed. This improves the real-time property of the phase distribution image (second electronic image).

Furthermore, when the phase object is moved forward and backward from the focused position at a high speed, mechanical driving from a stage, an objective or the like may be transmitted to the phase object as a vibration. This may adversely affect phase distribution images. In contrast, in the switching of illumination direction of oblique illumination, the mechanical driving is normally generated in a direction orthogonal to an optical axis, for example, as illustrated in Embodiment 1 described below. Thus, even if the vibration is transmitted to the phase object, the resultant adverse effect is very limited. Furthermore, as described below in Embodiments 2, 3, and 4, a plurality of phase distribution images in different illumination directions (first electronic images) can be acquired with mechanical driving completely eliminated. Hence, phase distribution images with a high contrast can be generated at a high speed with image quality prevented from being degraded by vibration.

Furthermore, the visualization method according to each embodiment of the present invention is desirably further characterized as follows.

First, the step of acquiring a plurality of first electronic images includes a step of acquiring a first electronic image of an observation target object that is a phase object illuminated in an oblique illumination from a first illumination direction, and a step of acquiring a first electronic image of the observation target object illuminated in an oblique illumination from a second illumination direction. The first illumination direction and the second illumination direction are symmetric with respect to the optical axis of an illumination optical system configured to illuminate the observation target object.

Thus, two phase distribution images with reversed contrasts (first electronic images) can be acquired. As a result, a phase distribution image with a high contrast (second electronic image) can be generated. This will be described below in detail.

On the other hand, the techniques disclosed in Japanese Patent Laid-Open No. 2004-354650 and Japanese Patent Laid-Open No. 2005-173288 need to pick up images of the phase object at defocused positions located forward and backward at the same distance from the focused position and symmetrically with respect to the focused position. Thus, the techniques disclosed in Japanese Patent Laid-Open No. 2004-354650 and Japanese Patent Laid-Open No. 2005-173288 in principle require a strict focusing operation before starting observation. In contrast, the visualization method according to each embodiment of the present invention requires no strict focusing operation. In normal bright field observation, the phase object is not observed at the focused position, and contrast is generated in an image of the phase object so as to vary with the amount of displacement from the focused position (defocus amount). Thus, the focusing operation involves relatively heavy burdens. Therefore, the visualization method according to each of the embodiments of the present invention is effective for simplifying the visualization operation.

Second, the visualization method according to each of the embodiments of the present invention desirably includes, before the step of acquiring a plurality of first electronic images of the observation target object, a step of placing the observation target object at a position displaced from a focused position of an image forming optical system in the direction of optical axis of the image forming optical system; the image forming optical system forming an optical image of the observation target object.

Phase distribution images (first electronic images) with the contrast and resolution thereof in balance are obtained by pre-adjusting the defocus amount while checking the phase distribution images. Thus, a phase distribution image with a high contrast and an appropriate resolution (second electronic image) can be generated.

Furthermore, in this case, the defocus amount is desirably very small and is limited to a value equal to or smaller than a focal depth determined by the pixel size of the image pickup element or the like. The limitation allows a pupil function of the image forming system to generate a phase distribution, thus causing a wavefront aberration. On the other hand, in fluorescent observation in which the observation target object is treated as a normal amplitude object, the limitation enables the adverse effect on observation images to be minimized. Therefore, the fluorescent observation can be used with or carried out simultaneously with phase contrast observation or differential interference contrast observation.

As described above, for visualization of the phase object, the phase object needs to be placed at a position displaced from the focused position of the image forming optical system. However, the phase object normally has a certain thickness and can thus be visualized without the need for an explicit defocus operation. However, the defocus amount is desirably pre-adjusted in order to acquire phase distribution images with the contrast and resolution thereof in balance and to limit the defocus amount to a value equal to or smaller than the focal depth.

It should be noted that the visualization method according to each embodiment of the present invention is different from the techniques disclosed in Japanese Patent Laid-Open No. 2004-354650 and Japanese Patent Laid-Open No. 2005-17328 in that after the defocus amount is pre-adjusted, a plurality of phase distribution images (first electronic images) are acquired with the defocus amount fixed.

Third, the step of generating a second electronic image desirably includes a step of calculating the difference between the plurality of first electronic images.

More specifically, the difference between phase distribution images with reversed contrasts (first electronic images) is desirably calculated. Calculating the difference between phase distribution images with reversed contrasts enables an increase in the contrast of the phase object in the image. Furthermore, a background portion is visualized with almost the same image intensity distribution regardless of the illumination direction of oblique illumination. Thus, for the background portion, the calculation of the difference allows the image intensity distribution to be offset. Thus, a phase distribution image with a higher contrast (second electronic image) can be generated.

With reference to FIG. 1A to FIG. 7, a technique will be described which enables a phase distribution image with a high contrast to be generated using a plurality of phase distribution images of an observation target object illuminated in an oblique illumination from different illumination directions (particularly illumination directions substantially symmetric with respect to the optical axis of the illumination optical system).

First, visualization of a phase object by observation in the defocus state will be described.

An image intensity distribution function I of an observation target object obtained via the image forming optical system is known to be expressed by:

$$I(x) = F^{-1}[OTF(f) \cdot OA(f)] \quad (1)$$

where x denotes space coordinates in an x-direction, f denotes a spatial frequency in the x direction, OTF denotes an optical transfer function of the image forming optical system, and OA denotes a Fourier transformation of amplitude distribution of the observation target object. Furthermore, $F^{-1}[\ ]$ denotes an operator indicative of an inverse Fourier transformation.

The optical transfer function indicates the image forming performance of the image forming optical system. Using a modulation transfer function (MTF) indicative of the rate of decrease in contrast and a phase transfer function (PTF) indicative of the degree of deviation of the phase, the optical transfer function (OTF) is expressed by:

$$OTF(f) = MTF(f) \cdot \exp(2\pi i \cdot PTF(F)) \quad (2)$$

Thus, based on Expressions (1) and (2), the image intensity distribution function I is expressed by:

$$I(x) = F^{-1}[MTF(f) \cdot \exp(2\pi i \cdot PTF(f)) \cdot OA(f)] \quad (3)$$

Moreover, if the observation target object is a phase object and has a small phase distribution, the image intensity distribution function I is approximately expressed by:

$$I(x) = F^{-1}[MTF(f) \cdot 2\pi i \cdot PTF(f) \cdot OP(f)] + BGC \quad (4)$$

where OP(f) denotes a Fourier transformation of phase distribution of the phase object, and BGC denotes a background component of an image corresponding to a 0th-order optical component having passed through the phase object.

As is apparent from Expression (4), when the observation target object is a phase object, if the PTF is zero, the phase object has no contrast with respect to the background. The phase object has a contrast with respect to the background only if the PTF has a value different from zero. The PTF is zero when an ideal optical system is in a focused state, but in the defocus state, has a value different from zero as a result of wavefront aberration occurring on the pupil plane. Hence, the phase object fails to be visualized when the phase object is in the focused position. However, the phase object can be visualized by observation in the defocus state.

Furthermore, Expression (4) clearly indicates that the contrast with respect to the background is determined using the product of the MTF and the PTF as a parameter.

Now, with reference to FIG. 1A to FIG. 6, a technique will be described which uses oblique illumination in different illumination directions to obtain phase distribution images (first electronic images) with reversed contrasts.

Figure 1B:
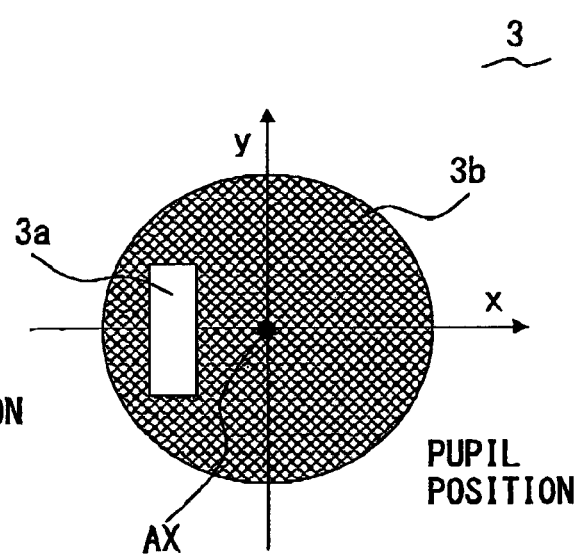
FIG. 1B is a top view of the oblique illumination section, illustrating the oblique illumination method for illuminating the observation target object in an oblique illumination from the first illumination direction.

FIG. 1A and FIG. 1B are diagrams for illustrating an oblique illumination method for illuminating an observation target object in an oblique illumination from a first illumination direction. FIG. 1A is a schematic side view of an illumination optical system and an oblique illumination section. FIG. 1B is a top view of the oblique illumination section.

As illustrated in FIG. 1A, an oblique illumination section 3 arranged at the pupil position of a condenser lens 2 included in the illumination optical system can be used to illuminate in an oblique illumination a phase object 1 arranged at the focal position of the condenser lens 2. More specifically, as illustrated in FIG. 1B, the oblique illumination section 3 is formed of a light blocking member 3b with an aperture 3a. When the aperture 3a is formed at a position eccentric to an optical axis AX, oblique illumination can be achieved using light at a particular illuminating angle from a particular direction (strictly speaking, the illumination angle has a particular range depending on the width of an aperture). FIG. 1A and FIG. 1B illustrate oblique illumination in a first illumination direction in which illumination is carried out at an illuminating angle θ1 from a −X direction.

Figure 2A:
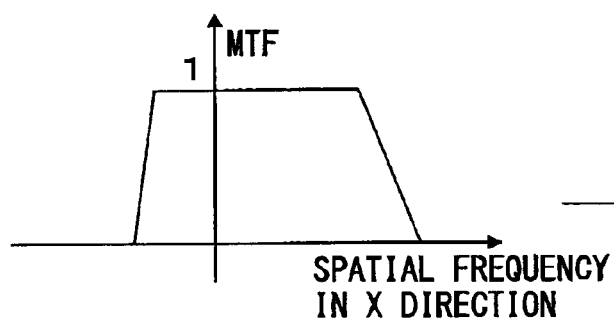
FIG. 2A is a diagram showing an X-directional MTF of an image forming optical system obtained when the observation target object is illuminated in an oblique illumination from the first illumination direction.
Figure 2B:
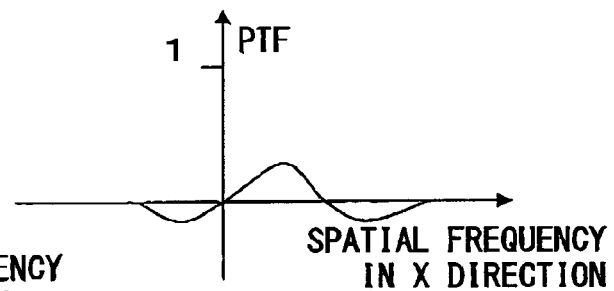
FIG. 2B is a diagram showing an X-directional PTF of the image forming optical system obtained when the observation target object is illuminated in an oblique illumination from the first illumination direction.
Figure 2C:
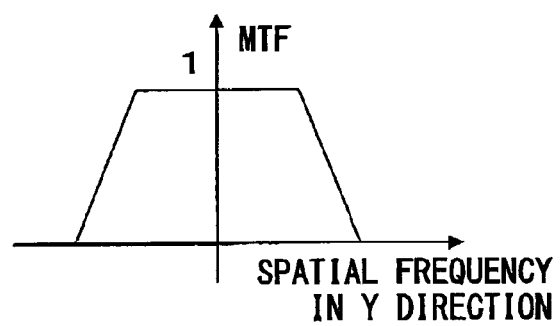
FIG. 2C is a diagram showing a Y-directional MTF of the image forming optical system obtained when the observation target object is illuminated in an oblique illumination from the first illumination direction.
Figure 2D:
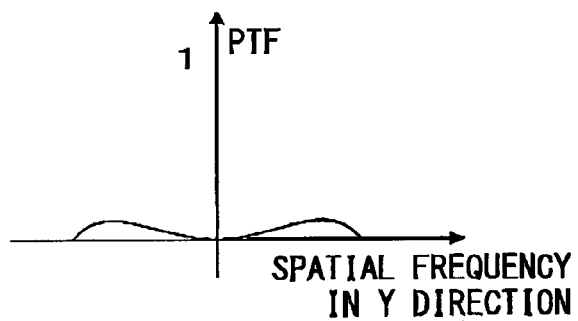
FIG. 2D is a diagram showing a Y-directional PTF of the image forming optical system obtained when the observation target object is illuminated in an oblique illumination from the first illumination direction.
Figure 3:
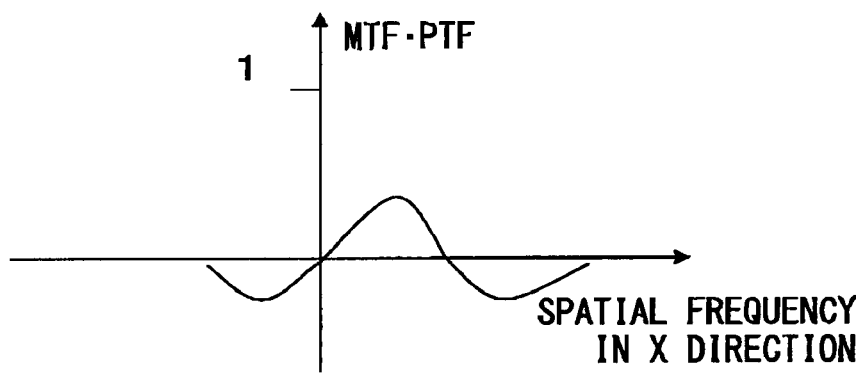
FIG. 3 is a diagram illustrating the product of the X-directional MTF and PTF of the image forming optical system obtained when the observation target object is illuminated in an oblique illumination from the first illumination direction.

FIG. 2A to FIG. 2D and FIG. 3 are diagrams illustrating the image forming characteristics of the image forming optical system observed when an observation target object is illuminated in an oblique illumination from the first illumination direction. FIG. 2A illustrates the X-directional MTF of the image forming optical system. FIG. 2B illustrates the X-directional PTF of the image forming optical system. FIG. 2C illustrates the Y-directional MTF of the image forming optical system. FIG. 2D illustrates the Y-directional PTF of the image forming optical system. FIG. 3 illustrates the product of the X-directional MTF and X-directional PTF of the image forming optical system.

As illustrated in FIG. 2A and FIG. 2C, with oblique illumination in the first illumination direction, the Y-directional MTF of the image forming system is shaped symmetrically with respect to a spatial frequency of 0. The X-directional MTF of the image forming system is shaped asymmetrically with respect to the spatial frequency of 0. More specifically, the X-directional MTF of the image forming optical system is biased toward the positive side of the spatial frequency and has different cutoff frequencies on the positive side and on a negative side.

Furthermore, as described above, the PTF of the image forming optical system has a value different from zero in the defocus state. As illustrated in FIG. 2B and FIG. 2D, with the oblique illumination in the first illumination direction, the Y-directional PTF of the image forming system, resulting from defocusing, is shaped symmetrically with respect to the spatial frequency of 0. The X-directional PTF of the image forming system, resulting from defocusing, is shaped asymmetrically with respect to the spatial frequency of 0 due to defocusing. More specifically, the X-directional PTF of the image forming optical system is biased toward the positive side of the spatial frequency.

Thus, as illustrated in FIG. 3, the product of the X-directional MTF and PTF of the image forming optical system is also shaped asymmetrically with respect to the spatial frequency of 0 so as to be biased toward the positive side of the spatial frequency and to have different spatial frequency ranges on the positive side and on the negative side.

FIG. 4A and FIG. 4B are diagrams illustrating diagrams illustrating an oblique illumination method for illuminating an observation target object in an oblique illumination from a second illumination direction. FIG. 4A is a schematic side view of an illumination optical system and an oblique illumination section. FIG. 4B is a top view of the oblique illumination section.

Unlike in FIG. 1A and FIG. 1B, in FIG. 4A and FIG. 4B, the aperture 3a is formed at a position eccentric to the optical axis AX in a +X direction. More specifically, the position of the aperture 3a illustrated in FIG. 4B and the position of the aperture 3a illustrated in FIG. 1B are substantially symmetric with respect to the optical axis AX. Thus, as illustrated in FIG. 4A, the phase object 1 is illuminated with light at the illuminating angle θ1 from the +X direction. This serves to achieve oblique illumination in the second illumination direction, which is in a substantially symmetric relation with the first illumination direction with respect to the optical axis AX.

Figure 5A:
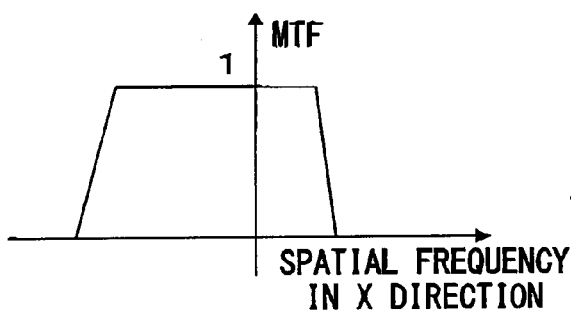
FIG. 5A is a diagram showing the X-directional MTF of the image forming optical system obtained when the observation target object is illuminated in an oblique illumination from the second illumination direction.
Figure 5B:
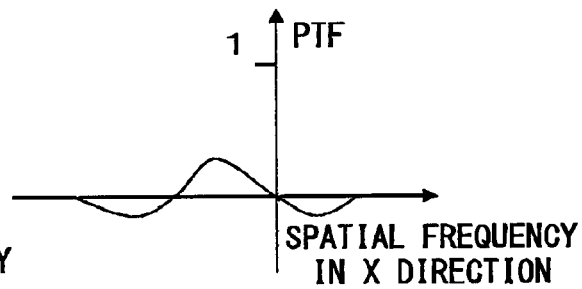
FIG. 5B is a diagram showing the X-directional PTF of the image forming optical system obtained when the observation target object is illuminated in an oblique illumination from the second illumination direction.
Figure 5C:
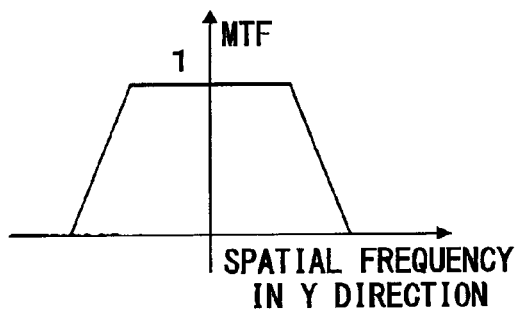
FIG. 5C is a diagram showing the Y-directional MTF of the image forming optical system obtained when the observation target object is illuminated in an oblique illumination from the second illumination direction.
Figure 5D:
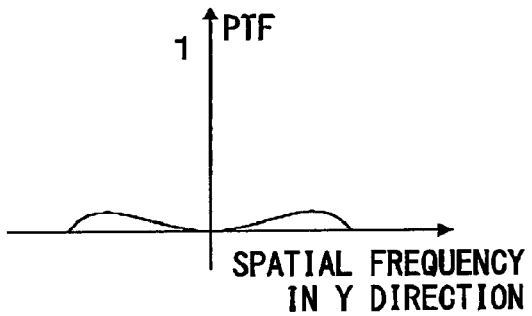
FIG. 5D is a diagram showing the Y-directional PTF of the image forming optical system obtained when the observation target object is illuminated in an oblique illumination from the second illumination direction.

FIG. 5A to FIG. 5D and FIG. 6 are diagrams illustrating the image forming characteristics of the image forming optical system observed when an observation target object is illuminated in an oblique illumination from the second illumination direction. FIG. 5A illustrates the X-directional MTF of the image forming optical system. FIG. 5B illustrates the X-directional PTF of the image forming optical system. FIG. 5C illustrates the Y-directional MTF of the image forming optical system. FIG. 5D illustrates the Y-directional PTF of the image forming optical system. FIG. 6 illustrates the product of the X-directional MTF and X-directional PTF of the image forming optical system.

The second illumination direction is in a substantially symmetric relation with the first illumination direction with respect to the optical axis AX. Thus, the PTF and MTF of the image forming optical system obtained by the oblique illumination in the second illumination direction as illustrated in FIG. 5A to FIG. 5D is in a substantially symmetric relation with the PTF and MTF of the image forming optical system obtained by the oblique illumination in the first illumination direction as illustrated in FIG. 2A to FIG. 2D, with respect to the spatial frequency of 0. Thus, the product of the X-direction MTF and PTF of the image forming optical system obtained by the oblique illumination in the second illumination direction as illustrated in FIG. 6 is in a substantially symmetric relation with the product of the x-direction MTF and PTF of the image forming optical system obtained by the oblique illumination in the first illumination direction as illustrated in FIG. 3, with respect to the spatial frequency of 0.

As described above, the product of the MTF and the PTF is a parameter that determines the contrasts of phase distribution images. Thus, the contrasts of phase distribution images are substantially reversed between the oblique illumination from the first illumination direction and the oblique illumination from the second illumination direction, in connection with which the product of the MTF and the PTF exhibits a substantially symmetric relation. That is, when the illumination directions of the oblique illumination are substantially symmetric with respect to the optical axis, phase distribution image with reversed contracts are obtained.

Now, with reference to FIG. 7, a technique will be described which uses phase distribution images with reversed contrasts (first electronic images) to generate a phase distribution image with a higher contrast (second electronic image).

FIG. 7 is a diagram illustrating the result of calculation of the difference between the product of the MTF and PTF illustrated in FIG. 3 and the product of the MTF and PTF illustrated in FIG. 6.

As illustrated in FIG. 7, the product of the MTF and the PTF resulting from the calculation of the difference is an odd function that is in a symmetric relation with respect to the origin; the difference is between the product of the MTF and the PTF obtained from the oblique illumination in the first illumination direction and the product of the MTF and the PTF obtained from the oblique illumination in the second illumination direction. More specifically, the product of the MTF and the PTF resulting from the calculation of the difference is an odd function which includes the spatial frequency range of the two products of the MTF and the PTF obtained before the calculation and which has a larger value. The odd function provides an image intensity distribution with a relief-like (differential image) contrast in the X direction.

Furthermore, when the image intensity distribution obtained from the oblique illumination in the second illumination direction is subtracted from the image intensity distribution obtained from the oblique illumination in the first illumination direction, the background component (BGC) contained in Expression (4) is removed. Thus, the phase distribution image resulting from the calculation of the difference (second electronic image) has only an image intensity distribution with a relief-like contrast in the X direction.

As described above, oblique illumination from different illumination directions (particularly illumination directions that are substantially symmetric with respect to the optical axis of the illumination optical system) enables phase distribution images with substantially reversed contrasts (first electronic images) to be obtained. Moreover, calculating the phase distribution images with substantially reversed contrasts (particularly calculating the difference between the phase distribution images) results in a phase distribution image with a higher contrast (second electronic image).

Furthermore, as illustrated in FIG. 7, the phase distribution images obtained by the oblique illumination from the different illumination directions can be used to reproduce a spatial frequency range wider than that reproduced using phase distribution images obtained by illumination from a given direction.

Additionally, the phase distribution image resulting from the calculation of the difference (second electronic image) is a differential image obtained by differentiating the phase distribution of the observation target object. A deconvolution process using the spatial frequency of the phase distribution image (second electronic image) results in an image intensity distribution proportional to the phase distribution of the observation target object. Such a deconvolution process is disclosed in ISHIWATA Hiroshi, ITOH Masahide, YATAGAI Toyohiko, "A new method of three-dimensional measurement by differential interference contrast microscope", Opt. Commun, Apr. 1, 2006, Vol. 260, No. 1, pp. 117-126. Thus, the phase distribution of the observation target object can be determined.

A visualization apparatus for implementing the above-described method will be described in the embodiments with reference to the drawings.

Embodiment 1

Figure 8:
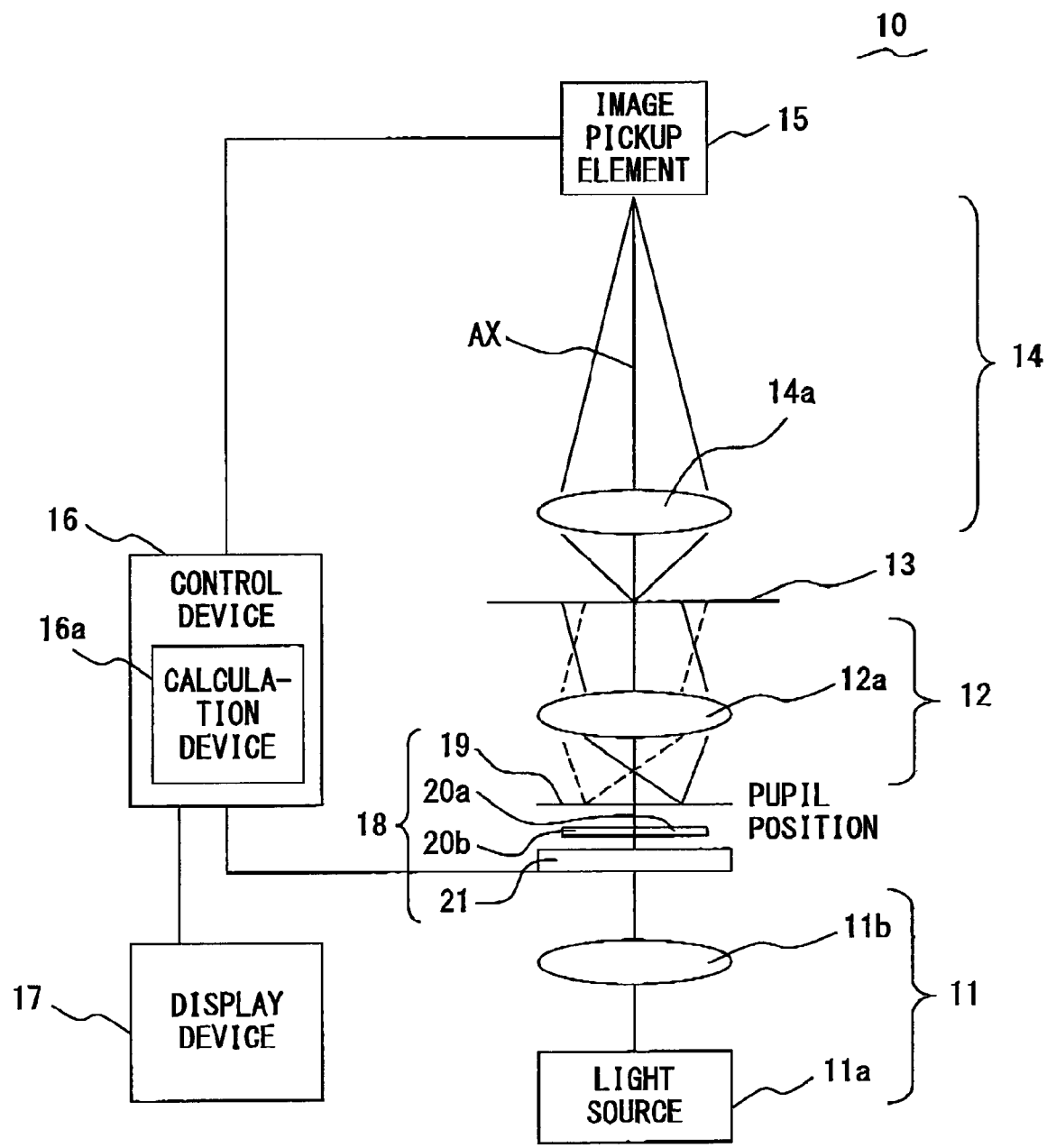
FIG. 8 is a diagram illustrating a configuration of a microscope apparatus according to Embodiment 1.
Figure 9:
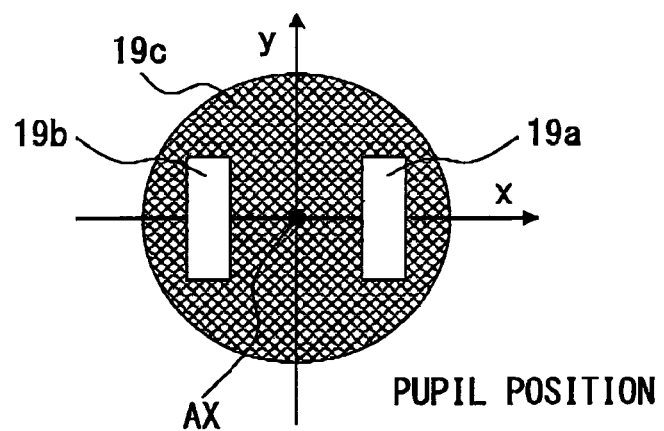
FIG. 9 is a top view of an oblique illumination section included in the microscope apparatus illustrated in FIG. 8.

FIG. 8 is a diagram illustrating a configuration of a microscope apparatus according to the present embodiment. FIG. 9 is a top view of an oblique illumination section included in the microscope apparatus illustrated in FIG. 8.

The microscope apparatus 10 illustrated in FIG. 8 is a visualization apparatus configured to visualize a phase object corresponding to an observation target object. The microscope apparatus 10 includes a light source unit 11 with a light source 11a and a collector lens 11b, an illumination optical system 12 including a condenser lens 12a that guides light from the light source 11a to a body specimen corresponding to a phase object 13, an image forming optical system 14 configured to form an optical image of the phase object 13 on an image plane, an image pickup element 15 arranged on the image plane, a control device 16 configured to, for example, control polarizers, and an oblique illumination control sections 18 configured to control the illumination direction of oblique illumination provided by the illumination optical system 12. Furthermore, the control device 16 includes a calculation device 16a configured to calculate a plurality of phase distribution images (first electronic images) of the phase object 13 obtained by the image pickup element 15 to generate a new phase distribution image (second electronic image).

The calculation device 16a may be arranged independently outside the control device 16 to calculate images.

Moreover, the microscope apparatus 10 includes a display device 17 configured to display the phase distribution image (second electronic image) generated by the calculation device 16a of the control device 16. The image forming optical system 14 includes an objective 14a and has a focal position of the image forming optical system 14 displaced with respect to the phase object 13.

As illustrated in FIG. 8, the oblique illumination control sections 18 includes an oblique illumination section 19 with an aperture arranged near or at the pupil position of the illumination optical system 12 (condenser lens 12a), a polarizer 20a serving as a first polarizer configured to allow transmission of light in a first polarizing direction, a polarizer 20b serving as a second polarizer configured to allow transmission of light in a second polarizing direction orthogonal to the first polarizing direction, and a polarizer 21 serving as a polarizing direction control section configured to control the polarizing direction of light. The polarizer 21 is arranged between the light source 11 and both the polarizers 20a and 20b so as to be rotatable around an axis of rotation parallel to the optical axis AX. Furthermore, the polarizers 20a and 20b are arranged substantially symmetrically with respect to the optical axis AX of the illumination optical system 12. Here, film-like polarizing plates or the like are preferably used as the polarizers 20a, 20b, and 21.

As illustrated in FIG. 9, the oblique illumination section 19 includes apertures 19a and 19b and a light blocking member 19c. The apertures 19a and 19b are arranged symmetrically with respect to the optical axis AX.

As illustrated in FIG. 8 and FIG. 9, the polarizer 20a is arranged over the aperture 19a, and the polarizer 20b is arranged over the aperture 19b. Furthermore, the polarizer 21 is arranged over both the apertures 19a and 19b.

In the microscope apparatus 10 configured as described above, the polarizers 20a, 20b, and 21 function as a polarizing shutter. Thus, the oblique illumination control sections 18, formed of the oblique illumination section 19 and the polarizing shutter, controls rotation of the polarizer 21 to operate the polarizing shutter. The oblique illumination control sections 18 can thus control the direction of oblique illumination from the oblique illumination section 19. Hence, the microscope apparatus 10 can acquire phase distribution images of the phase object 13 illuminated from different directions by the oblique illumination control sections 18.

Specifically, first, the polarizer 21 is rotated to allow the polarizing direction in which light passes through the polarizer 20a (first polarizing direction) to coincide with the polarizing direction in which light passes through the polarizer 21, while allowing the polarizing direction in which light passes through the polarizer 20b (second polarizing direction) to cross at right angles to the polarizing direction in which light passes through the polarizer 21. Thus, the phase object 13 is illuminated in an oblique illumination only through the aperture 19a. In other words, the phase object 13 is illuminated in an oblique illumination from the first illumination direction.

Moreover, the polarizer 21 is rotated to allow the polarizing direction in which light passes through the polarizer 20b (second polarizing direction) to coincide with the polarizing direction in which light passes through the polarizer 21, while allowing the polarizing direction in which light passes through the polarizer 20a (first polarizing direction) to cross at right angles to the polarizing direction in which light passes through the polarizer 21. Thus, the phase object 13 is illuminated in an oblique illumination only through the aperture 19b. In other words, the phase object 13 is illuminated in an oblique illumination from the second illumination direction.

In conjunction with such an operation of switching the oblique illumination, the microscope apparatus 10 retrieves images from the image pickup element 15 while the phase object 13 is being illuminated from the first illumination direction. Thus, the microscope apparatus 10 can acquire a phase distribution image of the phase object 13 illuminated in an oblique illumination from the first illumination direction. Furthermore, the microscope apparatus 10 retrieves an image from the image pickup element 15 while the phase object 13 is being illuminated from the second illumination direction. Thus, the microscope apparatus 10 can acquire a phase distribution image of the phase object 13 illuminated in an oblique illumination from the second illumination direction.

The apertures 19a and 19b are substantially symmetric with respect to the optical axis AX of the illumination optical system 12. Thus, the first illumination direction and the second illumination direction are substantially symmetric with respect to the optical axis AX of the illumination optical system 12. Hence, as described above, phase distribution images obtained in the first illumination direction and the second illumination direction have substantially reversed contrasts. Consequently, when the calculation device 16a of the control device 16 calculates the difference between the two phase distribution images obtained, a phase distribution image with a higher contrast (second electronic image) can be generated.

Furthermore, the illumination direction of the oblique illumination can be switched at a high speed by rotating the polarizer 21. Thus, phase distribution images in different illumination directions (first electronic images) can be obtained at a high speed. Moreover, the calculation device 16a of the control device 16 can generate a new phase distribution image with a higher contrast (second electronic images) at a high speed.

As described above, the microscope apparatus 10 according to the present embodiment can generate phase distribution images with high contrasts at a high speed. Furthermore, the microscope apparatus 10 according to the present embodiment is unlikely to cause the phase object 13 to vibrate even if the illumination direction of the oblique illumination is switched at an increased speed. This also allows image quality to be restrained from being degraded as a result of increased speed of image generation. Additionally, as illustrated in FIG. 8, optical elements or the like need not be added into the image forming optical system 14. This prevents a possible decrease in the transmissivity of the image forming optical system 14. The microscope apparatus 10 is thus suitable for the use of the fluorescent observation together with the phase contrast observation or differential interference contrast observation.

Moreover, the defocus amount may be adjusted before phase distribution images are acquired. The adjustment of the defocus amount allows phase distribution images with the contrast and resolution thereof in balance to be acquired. This serves to improve the balance between the contrast and resolution of phase distribution images obtained by the microscope apparatus 10. Furthermore, limiting the defocus amount to a value equal to or smaller than the focal depth allows the fluorescent observation to be effectively used with or carried out simultaneously with the phase contrast observation or differential interference contrast observation. Additionally, the adjustment of the defocus amount allows predetermination of a spatial frequency range to be obtained. Thus, using the determined spatial frequency range to carry out a deconvolution process allows an image with an image intensity distribution corresponding to the phase distribution of the phase object 13 to be generated instead of an image (differential image) with a relief-like contrast obtained by the difference calculation.

In view of the thickness of the body specimen corresponding to the phase object 13, the adjustment of the defocus amount is not an essential operation. Thus, phase distribution images with high contrasts can be generated by a simple operation. This allows the operation process of generating phase distribution images to be simplified.

Furthermore, FIG. 8 illustrates the polarizing shutter formed of the polarizers 20a, 20b, and 21. However, the present embodiment is not limited to this configuration.

For example, rotation of an aperture pattern arranged at the pupil position in FIG. 1B may be used instead of the polarizers.

Alternatively, the polarizer 21 may be replaced with a liquid crystal device formed of a polarizer and a liquid crystal element to rotate the polarizing direction. The liquid crystal device is used to control the polarizing direction of light emitted by the liquid crystal device so that the polarizing direction is parallel or orthogonal (orthogonal or parallel) to that of light passing through the polarizer 20a (light passing through the polarizer 20b). This allows the illumination direction of the oblique illumination to be switched at a higher speed than in the case where the polarizer 21 is rotated.

Alternatively, for example, a liquid crystal display device may be used which alternately displays aperture patterns instead of using the polarizers 20a, 20b, and 21. The liquid crystal display device is used to quickly switch the position of the aperture pattern displayed thereon between a first position (corresponding to the polarizer 20a) and a second position (corresponding to the polarizer 20b). This also allows the illumination direction of the oblique illumination to be switched at a high speed.

Embodiment 2

Figure 11:
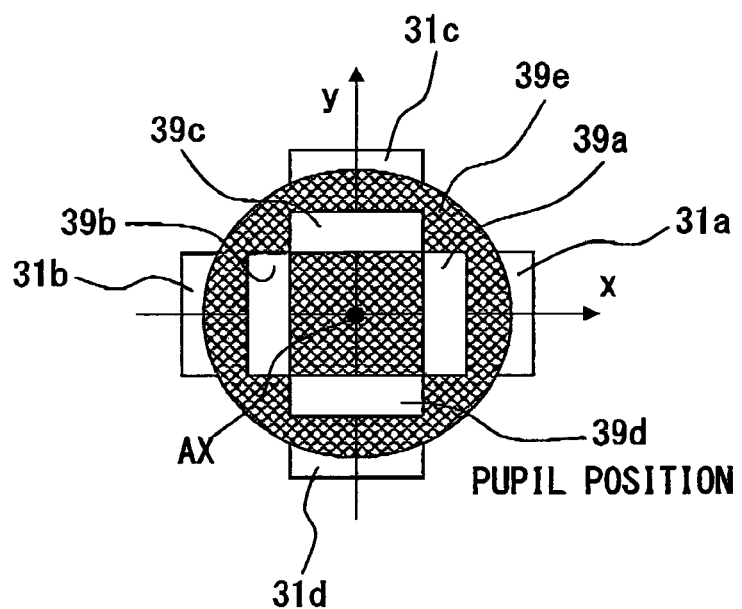
FIG. 11 is a top view of an oblique illumination control section included in the microscope apparatus illustrated in FIG. 10.

FIG. 10 is a diagram illustrating a configuration of a microscope apparatus according to the present embodiment. FIG. 11 is a top view of an oblique illumination control sections included in the microscope apparatus illustrated in FIG. 10.

The microscope apparatus 30 illustrated in FIG. 10 is similar to the microscope apparatus 10 illustrated in FIG. 8 except that the microscope apparatus 30 includes an LED light source 31 that replaces the light source unit 11 and an oblique illumination control sections 38 that replaces the oblique illumination control sections 18. Thus, components of the microscope apparatus 30 which are the same as those of the microscope apparatus 10 illustrated in FIG. 8 are denoted by the same reference numerals, and will not be described.

As illustrated in FIG. 10 and FIG. 11, the oblique illumination control sections 38 of the microscope apparatus 30 according to the present embodiment is formed of the LED light source 31 and an oblique illumination section 39 arranged near or at the pupil position.

As illustrated in FIG. 11, the oblique illumination section 39 is formed of an aperture 39a (first aperture), an aperture 39b (second aperture), an aperture 39c (third aperture), an aperture 39d (fourth aperture), and a light blocking member 39e. The apertures 39a and 39b are arranged parallel to the X axis. The apertures 39c and 39d are arranged parallel to the Y axis. That is, a combination of the apertures 39a and 39b and a combination of the apertures 39c and 39d are arranged orthogonally to each other. Furthermore, the apertures 39a and 39b are arranged symmetrically with respect to the optical axis AX. The apertures 39c and 39d are arranged symmetrically with respect to the optical axis AX.

As illustrated in FIG. 11, the LED light source 31 is formed of four LED light sources (LED light sources 31a, 31b, 31c, and 31d) arranged near or at the pupil position of the condenser lens 12a to illuminate the pupil plane using light guiding elements (not shown in the drawings). The LED light source 31a (first light source) uniformly illuminates the aperture 39a on the pupil plane. The LED light source 31b (second light source) uniformly illuminates the aperture 39b on the pupil plane. The LED light source 31c (third light source) uniformly illuminates the aperture 39c on the pupil plane. The LED light source 31d (fourth light source) uniformly illuminates the aperture 39d on the pupil plane.

In the microscope apparatus 30 configured as described above, light emission from the LED light source 31 is controlled to allow the illumination direction of the oblique illumination to be switched. Thus, the microscope apparatus 30 can acquire phase distribution images of the phase object 13 illuminated from different illumination directions by the oblique illumination control sections 38.

Specifically, the LED light source 31a emits light to illuminate the phase object 13 only through the aperture 39a. In other words, the phase object 13 is illuminated in an oblique illumination from a first illumination direction. Thereafter, the LED light source 31b emits light to illuminate the phase object 13 only through the aperture 39b. In other words, the phase object 13 is illuminated in an oblique illumination from a second illumination direction. Moreover, the LED light source 31c emits light to illuminate the phase object 13 only through the aperture 39c. In other words, the phase object 13 is illuminated in an oblique illumination from a third illumination direction. Moreover, the LED light source 31d emits light to illuminate the phase object 13 only through the aperture 39d. In other words, the phase object 13 is illuminated in an oblique illumination from a fourth illumination direction.

In conjunction with such an operation of switching the oblique illumination, the microscope apparatus 30 can retrieve images from the image pickup element 15 to separately acquire a phase distribution image of the phase object 13 illuminated in an oblique illumination from the first illumination direction, a phase distribution image of the phase object 13 illuminated in an oblique illumination from the second illumination direction, a phase distribution image of the phase object 13 illuminated in an oblique illumination from the third illumination direction, and a phase distribution image of the phase object 13 illuminated in an oblique illumination from the fourth illumination direction.

The apertures 39a and 39b are substantially symmetric with respect to the optical axis AX of the illumination optical system 12. Thus, the first illumination direction and the second illumination direction are substantially symmetric with respect to the optical axis AX of the illumination optical system 12. Hence, as described above, phase distribution images obtained in the first illumination direction and the second illumination direction have substantially reversed contrasts. Furthermore, the apertures 39c and 39d are substantially symmetric with respect to the optical axis AX of the illumination optical system 12. Thus, the third illumination direction and the fourth illumination direction are substantially symmetric with respect to the optical axis AX of the illumination optical system 12. Hence, phase distribution images obtained in the third illumination direction and the fourth illumination direction have substantially reversed contrasts. Consequently, when the calculation device 16a of the control device 16 calculates the difference between the phase distribution images obtained in the first and second illumination directions or in the third and fourth illumination directions, a phase distribution image with a higher contrast (second electronic image) can be generated.

Furthermore, the phase distribution images (second electronic images) generated by the difference calculation carried out by the calculation device 16a of the control device 16 are images with relief-like contrasts (differential images). The direction of the relief varies with the illumination direction. Specifically, the direction of the relief in one of the phase distribution images obtained (second electronic images) is orthogonal to that of the relief in the other phase distribution image; one of the phase distribution images is generated by the calculation of the difference between the phase distribution images (first electronic images) obtained in the first and second illumination directions, and the other is generated by the calculation of the difference between the phase distribution images (first electronic images) obtained in the third and fourth illumination directions. Thus, if the phase distribution of the phase object 13 exhibits a directional property, selection of the direction of the oblique illumination allows phase distribution images preferable for observation to be obtained.

Moreover, a phase distribution image with a relief-like contrast in any direction can be obtained by synthesizing the phase distribution image (second electron image) with the relief-like contrast generated by the calculation of the difference between the phase distribution images (first electronic images) obtained in the first and second illumination directions, with the phase distribution image (second electron image) with the relief-like contrast generated by the calculation of the difference between the phase distribution images (first electronic images) obtained in the third and fourth illumination directions. Therefore, a phase distribution images preferable for observation can be obtained.

The illumination direction of the oblique illumination can be switched at a high speed by controlling the light emission from the LED light source 31. Thus, phase distribution images in different illumination directions (first electronic images) can be acquired at a high speed. Furthermore, the calculation device 16a of the control device 16 can generate a new phase distribution image with a higher contrast (second electronic images) at a high speed.

As described above, like the microscope apparatus 10 according to Embodiment 1, the microscope apparatus 30 according to the present embodiment can generate phase distribution images with high contrasts at a high speed. Furthermore, in the microscope apparatus 30 according to the present embodiment, the switching operation involves no mechanical driving. Thus, the phase object 13 is unlikely to vibrate even if the illumination direction of the oblique illumination is switched at an increased speed. The image quality is prevented from being degraded as a result of increased speed of image generation. Additionally, as illustrated in FIG. 10, optical elements or the like need not be added into the image forming optical system 14. This prevents a possible decrease in the transmissivity of the image forming optical system 14. The microscope apparatus 30 is thus suitable for the use of the fluorescent observation together with the phase contrast observation or differential interference contrast observation.

Moreover, the microscope apparatus 30 is similar to the microscope apparatus 10 according to Embodiment 1 in the following aspects. Adjusting the defocus amount before acquisition of phase distribution images allows the balance between the contrast and resolution of the phase distribution images to be improved. Limiting the defocus amount to a value equal to or smaller than the focal depth allows the fluorescent observation to be effectively used with or carried out simultaneously with the phase contrast observation or differential interference contrast observation. Carrying out a deconvolution process allows generation of an image with an image intensity distribution corresponding to the phase distribution of the phase object 13. Furthermore, as is the case with microscope apparatus 10 according to Embodiment 1, the adjustment of the defocus amount is not an essential operation. This allows the operation process of generating phase distribution images to be simplified.

In addition, FIG. 10 illustrates the example in which the oblique illumination control sections 38 controls the oblique illumination from the four directions. However, the present embodiment is not limited to this configuration. The numbers of apertures and LED light sources may be increased so that the oblique illumination control sections 38 can control oblique illumination from six or more illumination directions.

Embodiment 3

Figure 12:
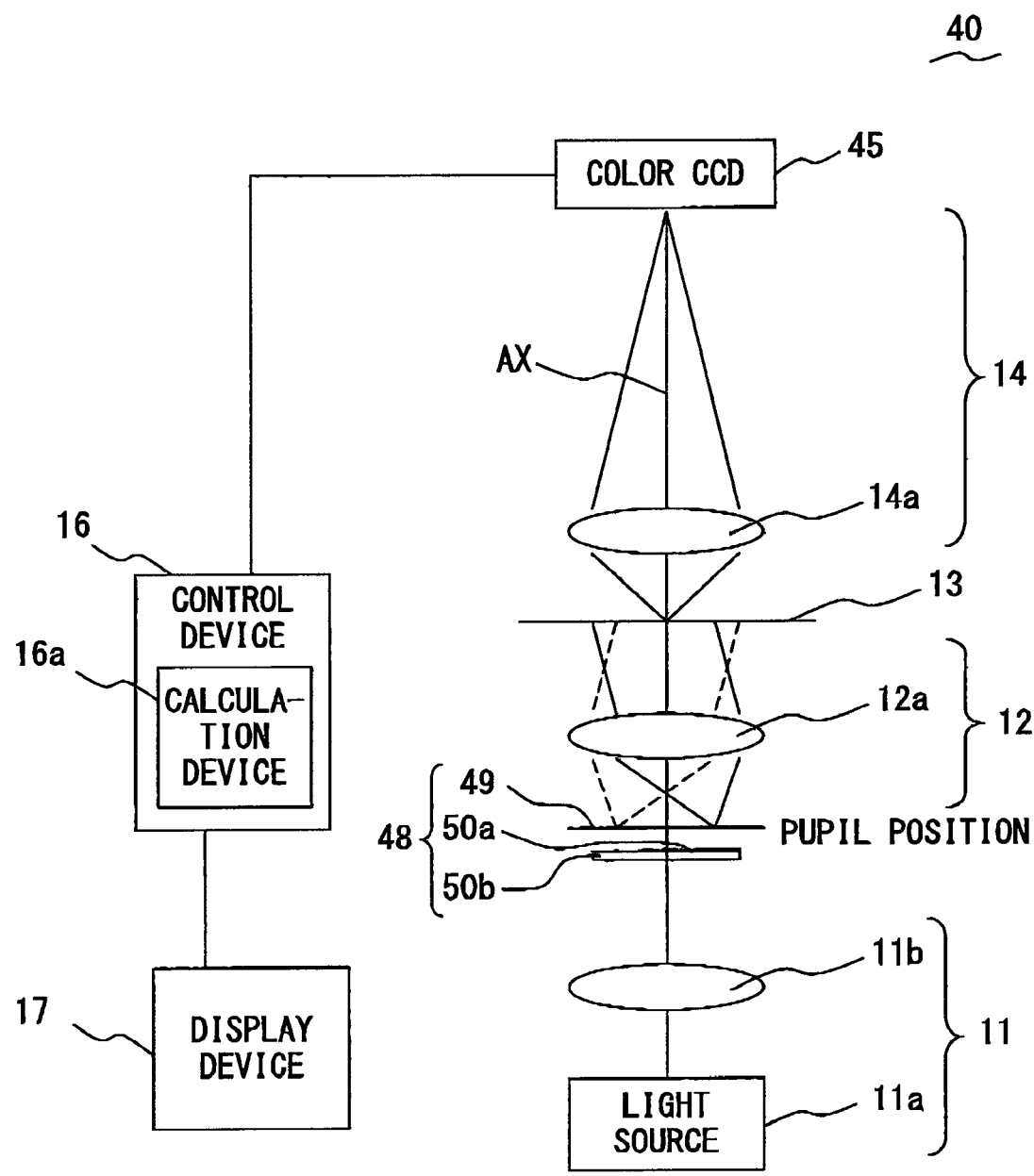
FIG. 12 is a diagram illustrating a configuration of a microscope apparatus according to Embodiment 3.

FIG. 12 is a diagram illustrating a configuration of a microscope apparatus according to the present embodiment. FIG. 13 is a top view of an oblique illumination section included in the microscope apparatus illustrated in FIG. 12. FIG. 14A and FIG. 14B are diagrams each illustrating a configuration of a color CCD included in the microscope apparatus illustrated in FIG. 12.

The microscope apparatus 40 illustrated in FIG. 12 is similar to the microscope apparatus 10 illustrated in FIG. 8 except that the microscope apparatus 40 includes a color CCD 45 that replaces the image pickup element 15 and an oblique illumination control sections 48 that replaces the oblique illumination control sections 18. Thus, hereinafter, components of the microscope apparatus 40 which are the same as those of the microscope apparatus 10 illustrated in FIG. 8 are denoted by the same reference numerals, and will not be described.

As illustrated in FIG. 12, the oblique illumination control sections 48 of the microscope apparatus 40 according to the present embodiment is formed of an oblique illumination section 49 arranged near or at the pupil position, a color filter 50*a* configured to allow light with a blue wavelength region (first wavelength region) to pass through, and a color filter 50*b* configured to allow light with a red wavelength region (second wavelength region) to pass through.

The color filter 50*a* is desirably a band pass filter with spectral characteristics corresponding to substantially the same band as that of a blue filter included in the color CCD 45 or a band narrower than that the blue filter. Similarly, the color filter 50*b* is desirably a band pass filter with spectral characteristics corresponding to substantially the same band as that of a red filter included in the color CCD 45 or a band narrower than that the blue filter.

As illustrated in FIG. 13, the oblique illumination section 49 is formed of apertures 49*a* and 49*b* and a light blocking member 49*c*. The apertures 49*a* and 49*b* are arranged symmetrically with respect to the optical axis AX.

As illustrated in FIG. 12 and FIG. 13, the color filter 50*a* is arranged over the aperture 49*a*. The color filter 50*b* is arranged over the aperture 49*b*.

In the microscope apparatus 40 configured as described above, a single- or three-shot CCD 45 can be used to acquire phase distribution images of the phase object 13 illuminated from different illumination directions by the oblique illumination control sections 4B, by retrieving information from pixels corresponding to the color filters.

Specifically, if a single-shot color CCD 51 illustrated in FIG. 14A is used as the color CCD 45, the single-shot color CCD 51 includes a plurality of pixels B configured to detect light in the blue wavelength region, a plurality of pixels R configured to detect light in the red wavelength region, and a plurality of pixels G configured to detect light in a green wavelength region. Thus, with the phase object 13 illuminated in an oblique illumination simultaneously with light in the blue wavelength region from the first illumination direction and with light in the red wavelength region from the second illumination direction, the single-shot color CCD 51 can utilize the difference in the wavelength region of illumination light to separately acquire a phase distribution image of the phase object 13 illuminated in an oblique illumination from the first illumination direction and a phase distribution image of the phase object 13 illuminated in an oblique illumination from the second illumination direction.

A common array of pixels in the single-shot color CCD 51 is a Bayer array in which the number of green pixels is twice as large as that of red or blue pixels as illustrated in FIG. 14A. If the single-shot color CCD 51 with the Bayer array is used to detect light, with the phase object 13 illuminated with light in the blue and red wavelength regions, then light is detected with pixels that are a quarter of all the pixels in the single-shot color CCD 51 in number. Thus, data on all the pixels is generated by an interpolation calculation, but the small number of pixels used for detection leads to a reduction in image information on phase distribution images generated (first electronic images).

In view of this, if the single-shot color CCD 51 is used, the color filters 50*a* and 50*b* may be replaced with a color filter 50*c* configured to allow light in the green wavelength region to pass through and a color filter 50*d* configured to allow light in a magenta wavelength region including the blue and red wavelength regions to pass through. Then, with the phase object 13 illuminated in an oblique illumination simultaneously with light in the green wavelength region from the first illumination direction and with light in the red and blue wavelength regions from the second illumination direction, the single-shot color CCD 51 can utilize the difference in the wavelength region of illumination light to separately acquire a phase distribution image of the phase object 13 illuminated in an oblique illumination from the first illumination direction and a phase distribution image of the phase object 13 illuminated in an oblique illumination from the second illumination direction. Compared to the use of the color filters 50*a* and 50*b* for acquisition, the use of the color filters 51*c* and 51*d* allows light to be detected with a double number of pixels. This allows phase distribution images (first electronic images) with larger information amounts to be obtained.

Furthermore, if a three-shot color CCD 52 illustrated in FIG. 14B is used as the color CCD 45, the three-shot color CCD 52 includes a dichroic prism 53 configured to separate incident light into the red wavelength region, the blue wavelength region, and the green wavelength region, and three CCDs (red CCD 54*a*, green CCD 54*b*, and blue CCD 54*c*) configured to detect the wavelength regions resulting from the wavelength separation. Then, with the phase object 13 illuminated in an oblique illumination simultaneously with light in the blue wavelength region from the first illumination direction and with light in the red wavelength region from the second illumination direction, the three-shot color CCD 52 can utilize the difference in the wavelength region of illumination light to separately acquire a phase distribution image of the phase object 13 illuminated in an oblique illumination from the first illumination direction by the blue CCD 54c and a phase distribution image of the phase object 13 illuminated in an oblique illumination from the second illumination direction by the red CCD 54a.

The apertures 49a and 49b are substantially symmetric with respect to the optical axis AX of the illumination optical system 12. Thus, the first illumination direction and the second illumination direction are substantially symmetric with respect to the optical axis AX of the illumination optical system 12. Hence, as described above, phase distribution images obtained in the first illumination direction and the second illumination direction have substantially reversed contrasts. Consequently, when the calculation device 16a of the control device 16 calculates the difference between the phase distribution images obtained in the first illumination direction and the second illumination direction, a phase distribution image with a higher contrast (second electronic image) can be generated.

Furthermore, the microscope apparatus 40 requires no operation of switching the illumination direction of oblique illumination. Thus, phase distribution images in different illumination directions (first electronic images) can be acquired at a high speed. Additionally, the calculation device 16a of the control device 16 can generate a new phase distribution image with a higher contrast (second electronic images) at a high speed.

As described above, like the microscope apparatus 10 according to Embodiment 1, the microscope apparatus 40 according to the present embodiment can generate phase distribution images with high contrasts at high speed. Furthermore, the microscope apparatus 40 according to the present embodiment requires no switching operation. The microscope apparatus 40 thus inhibits possible vibration of the phase object 13 and possible degradation of the image quality resulting from increased speed of image generation. Additionally, as illustrated in FIG. 12, optical elements or the like need not be added into the image forming optical system 14. This prevents a possible decrease in the transmissivity of the image forming optical system 14. The microscope apparatus 40 is thus suitable for the use of the fluorescent observation together with the phase contrast observation or differential interference contrast observation.

Moreover, the microscope apparatus 40 is similar to the microscope apparatus 10 according to Embodiment 1 in the following aspects. Adjusting the defocus amount before acquisition of phase distribution images allows the balance between the contrast and resolution of the phase distribution images to be improved. Limiting the defocus amount to a value equal to or smaller than the focal depth allows the fluorescent observation to be used with or carried out simultaneously with the phase contrast observation or differential interference contrast observation. Carrying out a deconvolution process allows generation of an image with an image intensity distribution corresponding to the phase distribution of the phase object 13. Furthermore, as is the case with the microscope apparatus 10 according to Embodiment 1, the adjustment of the defocus amount is not an essential operation. This allows the operation process of generating phase distribution images to be simplified.

Embodiment 4

Figure 15:
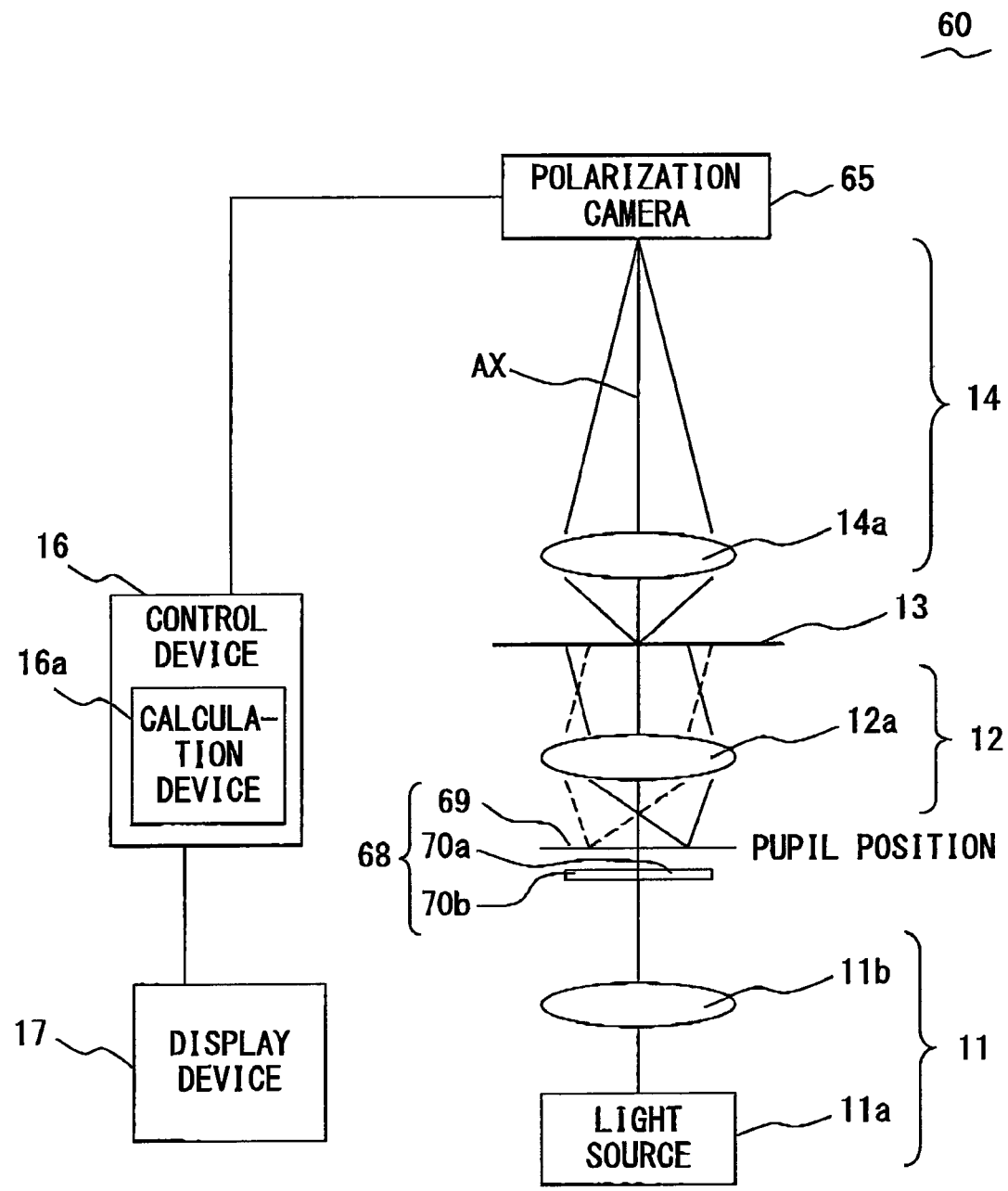
FIG. 15 is a diagram illustrating a configuration of a microscope apparatus according to Embodiment 4.

FIG. 15 is a diagram illustrating a configuration of a microscope apparatus according to the present embodiment. FIG. 16 is a diagram illustrating a configuration of a polarization camera included in the microscope apparatus illustrated in FIG. 15. FIG. 17 is a top view of an oblique illumination section included in the microscope apparatus illustrated in FIG. 15.

The microscope apparatus 60 illustrated in FIG. 15 is similar to the microscope apparatus 10 illustrated in FIG. 8 except that the microscope apparatus 60 includes a polarization camera 65 that replaces the image pickup element 15 and an oblique illumination control sections 68 that replaces the oblique illumination control sections 18. Thus, hereinafter, components of the microscope apparatus 60 which are the same as those of the microscope apparatus 10 illustrated in FIG. 8 are denoted by the same reference numerals, and will not be described.

As illustrated in FIG. 15, the oblique illumination control sections 68 of the microscope apparatus 60 according to the present embodiment includes an oblique illumination section 69 arranged near or at the pupil position, a polarizer 70a serving as a first polarizer configured to allow transmission of light in a first polarizing direction, and a polarizer 70b serving as a second polarizer configured to allow transmission of light in a second polarizing direction orthogonal to the first polarizing direction. Unlike the oblique illumination control sections 18 of the embodiment 1, the oblique illumination control sections 68 does not include the polarizer 21 arranged so as to be rotatable around an axis of rotation parallel to the optical axis AX.

As illustrated in FIG. 16, the polarization camera 65 is an image pickup element formed of a plurality of pixels so that four pixels are repeatedly arranged so as to detect light corresponding to four polarizing directions; the four pixels include four polarizers arranged in a 2×2 matrix and having respective polarizing directions (shown by arrows in FIG. 16) different from one another by 45°. The polarization camera 65 is disclosed in, for example, Shojiro KAWAKAMI "Industrial Applications of Stacked Photonic Crystals" Appl. Phys. Lett., Volume 77, No. 5. Here, the polarization camera 65 is arranged such that two of the polarizing directions of light passing through the four polarizers of the polarization camera 65 coincide with the polarizing direction of light passing through the polarizer 70a and the polarizing direction of light passing through the polarizer 70b, respectively.

As illustrated in FIG. 17, the oblique illumination section 69 is formed of apertures 69a and 69b and a light blocking member 69c. The apertures 69a and 69b are arranged symmetrically with respect to the optical axis AX.

As illustrated in FIG. 15 and FIG. 17, the polarizer 70a is arranged over the aperture 69a. The polarizer 70b is arranged over the aperture 69b.

In the microscope apparatus 60 configured as described above, the polarization camera 65 can be used to acquire phase distribution images of the phase object 13 illuminated from different illumination directions by the oblique illumination control sections 68.

Specifically, with the phase object 13 illuminated in an oblique illumination simultaneously with light in the first polarizing direction passing through the aperture 69a, that is, light from the first illumination direction, and with light in the second polarizing direction passing through the aperture 69b, that is, light from the second illumination direction, the polarization camera 65 can utilize the difference in the polarizing direction of illumination light to separately acquire a phase distribution image of the phase object 13 illuminated in an oblique illumination from the first illumination direction and a phase distribution image of the phase object 13 illuminated in an oblique illumination from the second illumination direction.

The apertures 69a and 69b are substantially symmetric with respect to the optical axis AX of the illumination optical system 12. Thus, the first illumination direction and the second illumination direction are substantially symmetric with respect to the optical axis AX of the illumination optical system 12. Hence, as described above, phase distribution images obtained in the first illumination direction and the second illumination direction have substantially reversed contrasts. Consequently, when the calculation device 16a of the control device 16 calculates the difference between the phase distribution images obtained in the first illumination direction and the second illumination direction, a phase distribution image with a higher contrast (second electronic image) can be generated.

Furthermore, the microscope apparatus 60 requires no operation of switching the illumination direction of oblique illumination. Thus, phase distribution images in different illumination directions (first electronic images) can be acquired at a high speed. Additionally, the calculation device 16a of the control device 16 can generate a new phase distribution image with a higher contrast (second electronic images) at a high speed.

As described above, like the microscope apparatus 10 according to Embodiment 1, the microscope apparatus 60 according to the present embodiment can generate phase distribution images with high contrasts. Furthermore, the microscope apparatus 60 according to the present embodiment requires no switching operation. The microscope apparatus 60 thus inhibits possible vibration of the phase object 13 and possible degradation of the image quality resulting from increased speed of image generation. Additionally, as illustrated in FIG. 15, optical elements or the like need not be added into the image forming optical system 14. This prevents a possible decrease in the transmissivity of the image forming optical system 14. The microscope apparatus 60 is thus suitable for the use of the fluorescent observation together with the phase contrast observation or differential interference contrast observation.

Moreover, the microscope apparatus 60 is similar to the microscope apparatus 10 according to Embodiment 1 in the following aspects. Adjusting the defocus amount before acquisition of phase distribution images allows the balance between the contrast and resolution of the phase distribution images to be improved. Limiting the defocus amount to a value equal to or smaller than the focal depth allows the fluorescent observation to be used with or carried out simultaneously with the phase contrast observation or differential interference contrast observation. Carrying out a deconvolution process allows generation of an image with an image intensity distribution corresponding to the phase distribution of the phase object 13. Furthermore, as is the case with the microscope apparatus 10 according to Embodiment 1, the adjustment of the defocus amount is not an essential operation. This allows the operation process of generating phase distribution images to be simplified.

In Embodiments 1 to 4 described above, the body specimen is illustrated as an example of the phase object. However, these embodiments are not limited to this case. For example, in metal with a very small step on the surface thereof, the step on the surface causes a difference in optical path length, which leads to a difference in the phase of light. Thus, metal with a step can be considered to be a phase object. Hence, the "phase object" in the specification includes objects that can be considered to be phase objects unless otherwise specified.

Embodiment 5

FIG. 18 is a diagram illustrating a configuration of a microscope apparatus according to the present embodiment. FIG. 19A and FIG. 19B are diagrams illustrating a multi-well plate used for observation with the microscope apparatus illustrated in FIG. 18. FIG. 19A is a perspective view of the multi-well plate. FIG. 19B is a cross-sectional view of the multi-well plate.

The microscope apparatus 80 illustrated in FIG. 18 is similar to the microscope apparatus 10 illustrated in FIG. 8 except that the microscope apparatus 80 is configured as an inverted microscope that illuminates the phase object 13 from above to allow the phase object 13 to be observed from below and that the phase object 13, corresponding to an observation target object, is cultured in a culture solution 83 in the multi-well plate 81 illustrated in FIG. 19A and FIG. 19B. Thus, Components of the microscope apparatus 80 which are the same as those of the microscope apparatus 10 illustrated in FIG. 8 are denoted by the same reference numerals, and will not be described.

As illustrated in FIG. 19A, the multi-well plate 81 used in the present embodiment has a configuration which includes a plurality of small containers called wells 82. Furthermore, as illustrated in FIG. 19B, the phase object 13 immersed in the culture solution 83 is arranged in each well 82 in the multi-well plate 81. If a phase object cultured in a culture vessel such as the multi-well plate 81 is used as an observation target object, the phase object can be visualized by the above-described method using oblique illumination as is the case where the observation target object is a phase object prepared as a slide specimen (prepared slide) or metal with a step. Thus, like the microscope apparatus 10 according to Embodiment 1, the microscope apparatus 80 according to the present embodiment can generate phase distribution images with high contrasts at a high speed as well.

In the present embodiment, the multi-well plate is illustrated as a culture vessel. However, the culture vessel is not limited to the multi-well plate, but may be a petri dish (also called a dish), for example.

If a slide specimen is illuminated in an oblique illumination for observation, the phase object is visualized when light diffracted by microstructures in the phase object causes a contrast with respect to the background as described above. In contrast, if a phase object cultured in a culture vessel is illuminated in an oblique illumination for observation as illustrated in the present embodiment, the visualization of the phase object receives contribution not only from the light diffracted by the microstructures but also from light refracted at the boundary between the phase object and the culture solution. With the slide specimen, light is very weakly refracted at the boundary between a cell and a medium to which the cell is anchored, for example, because the medium has a refractive index similar to that of the cell or because the cell cannot maintain its original shape in the culture vessel. Thus, it would appear that only diffracted light is generated and refracted light is not generated.

Furthermore, in the formation of images based on diffracted light, the product of the PTF and MTF serves as a parameter that determines the contrast as described above. Like the MTF, the PTF, which is indicative of the condition of phase shift, contributes to the image formation. In contrast, in the formation of contour images, the impact of PTF of the optical system is limited. For the formation of contour images, the impact of the MTF is dominant. The MTF depends on the refractive power exerted at the boundary between the cell and the culture solution and the intensity of light introduced into the optical system.

In general, the MTF and the PTF vary depending on the position and shape of the aperture arranged in the illumination optical system. Thus, the adjustment of the position and shape of the aperture allows the image intensity distribution of the phase object to be varied. A more preferable aperture position and shape will be specifically described below.

Figures 20A, 20B:
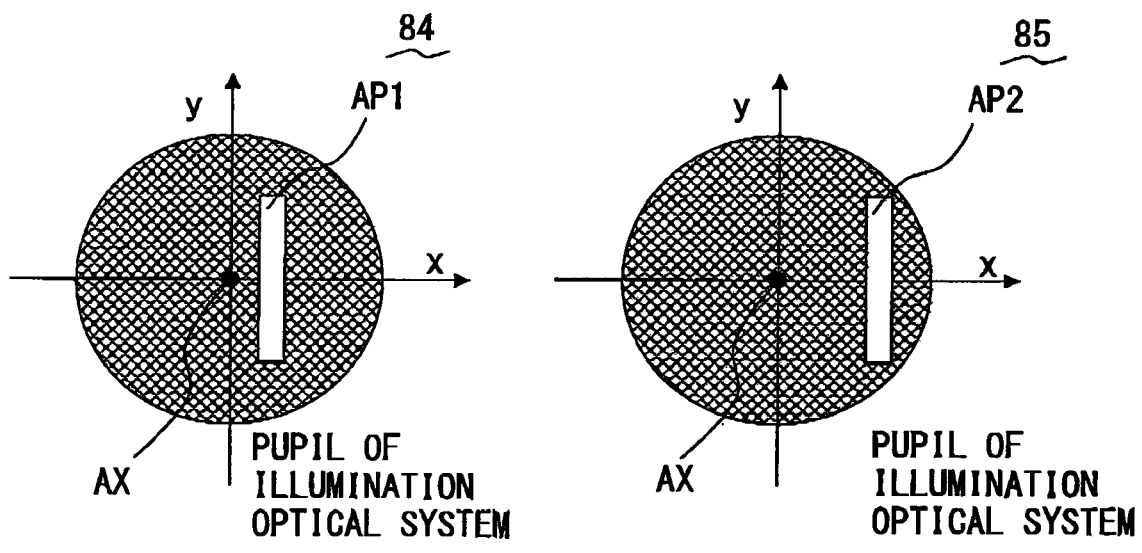
FIG. 20A is a diagram illustrating an oblique illumination section with an aperture formed at a position relatively close to a pupil center, to describe the position of the aperture formed in the oblique illumination section.
FIG. 20B is a diagram illustrating an oblique illumination section with an aperture formed at a position relatively away from the pupil center, to describe the position of the aperture formed in the oblique illumination section.

FIG. 20A and FIG. 20B illustrate oblique illumination sections with different aperture positions. FIG. 20A illustrates an oblique illumination section 84 with an aperture AP1 formed relatively close to the optical axis AX, that is, the pupil center. FIG. 20B illustrates an oblique illumination section 85 with an aperture AP2 formed relatively away from the pupil center.

Figures 21A, 21B:
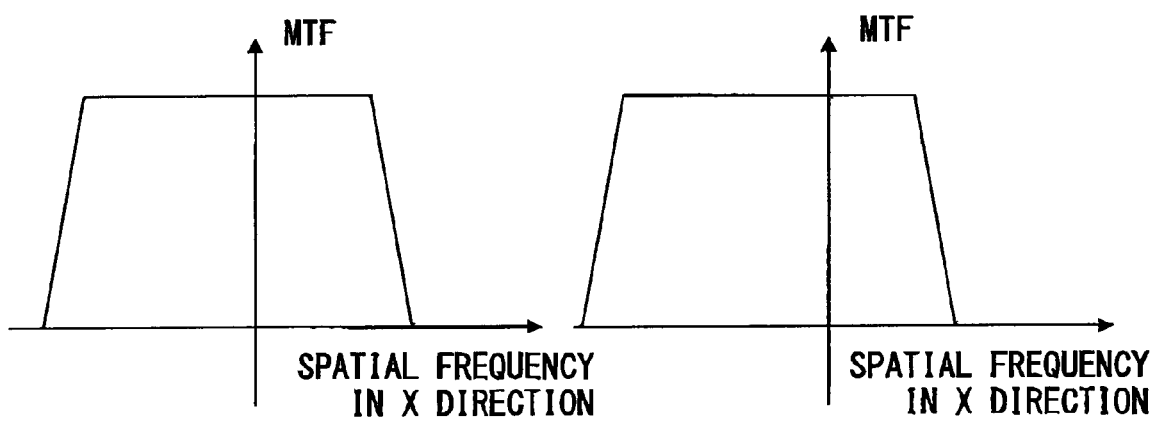
FIG. 21A is a diagram illustrating the MTF of the image forming optical system obtained when an observation target object is illuminated in an oblique illumination through each aperture illustrated in FIG. 20A.
FIG. 21B is a diagram illustrating the MTF of the image forming optical system obtained when the observation target object is illuminated in an oblique illumination through each aperture illustrated in FIG. 20B.

FIG. 21A and FIG. 21B are diagrams showing the MTF of the image forming optical system obtained when the oblique illumination sections illustrated in FIG. 20A and FIG. 20B, respectively, are used to illuminate the observation target object. FIG. 21A shows the MTF of the image forming optical system obtained when the oblique illumination section 84 illustrated in FIG. 20A is used to illuminate the observation target object. FIG. 21B shows the MTF of the image forming optical system obtained when the oblique illumination section 85 illustrated in FIG. 20B is used to illuminate the observation target object.

Figures 22A, 22B:
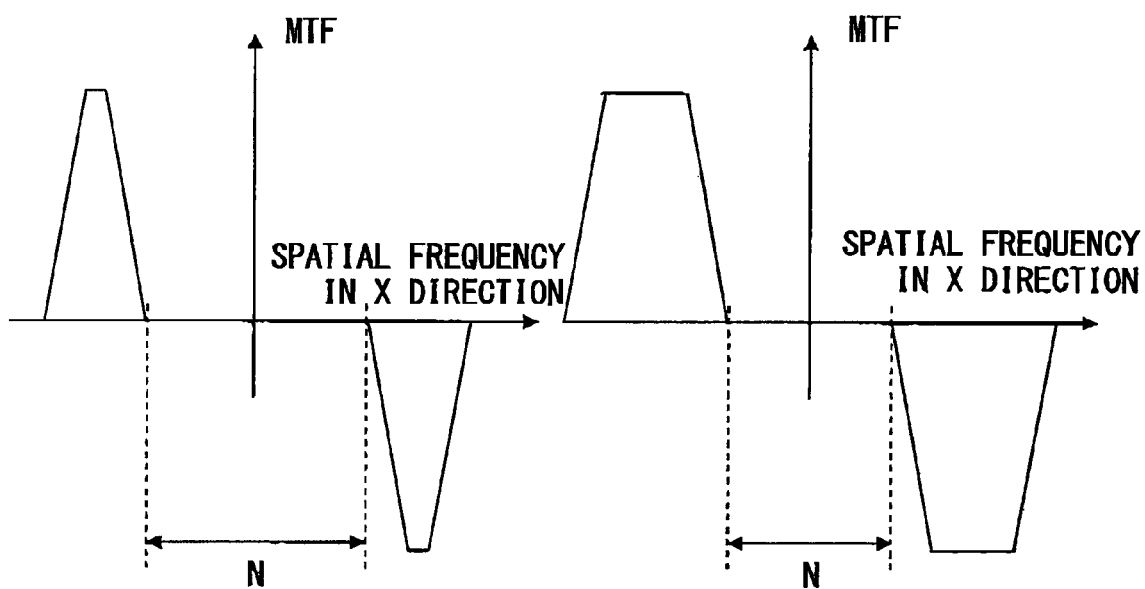
FIG. 22A is a diagram illustrating the result of calculation of the difference between the MTF illustrated in FIG. 21A and an MTF with a symmetric relation with the MTF illustrated in FIG. 21A.
FIG. 22B is a diagram illustrating the result of calculation of the difference between the MTF illustrated in FIG. 21B and an MTF with a symmetric relation with the MTF illustrated in FIG. 21B.

FIG. 22A and FIG. 22B are diagrams each showing the result of calculation of the difference between the MTF illustrated in the corresponding one of FIG. 21A and FIG. 21B and an MTF with a symmetric relation with the MTF illustrated in FIG. 21A or FIG. 21B. FIG. 22A shows the result of calculation of the difference between the MTF illustrated in FIG. 21A and an MTF with a symmetric relation with the MTF illustrated in FIG. 21A. FIG. 22B shows the result of calculation of the difference between the MTF illustrated in FIG. 21B and an MTF with a symmetric relation with the MTF illustrated in FIG. 21B.

As shown in FIG. 21A and FIG. 21B, compared to the use of the oblique illumination section 85 with the aperture AP2, the use of the oblique illumination section 84 with the aperture AP1 allows the MTF to exhibit a shape close to symmetry with respect to a spatial frequency of 0. Thus, when the difference between the MTF shown in each of FIG. 21A and FIG. 21B and an MTF obtained by illumination from a direction with a substantially symmetric relation with the MTF in FIG. 21A or FIG. 21B, the use of the oblique illumination section 84 with the aperture AP1 results in a wider low frequency region N with no response than the use of the oblique illumination section 85 with the aperture AP2, as shown in FIG. 22A and FIG. 22B.

The refracted light generated at the boundary between the cell and the culture solution corresponds to a region with low spatial frequencies. Thus, in view of this, if a phase object cultured in a culture vessel is observed as illustrated in the present embodiment, the oblique illumination section 19 desirably includes apertures 19a and 19b formed at certain distances from the pupil center.

Figure 23:
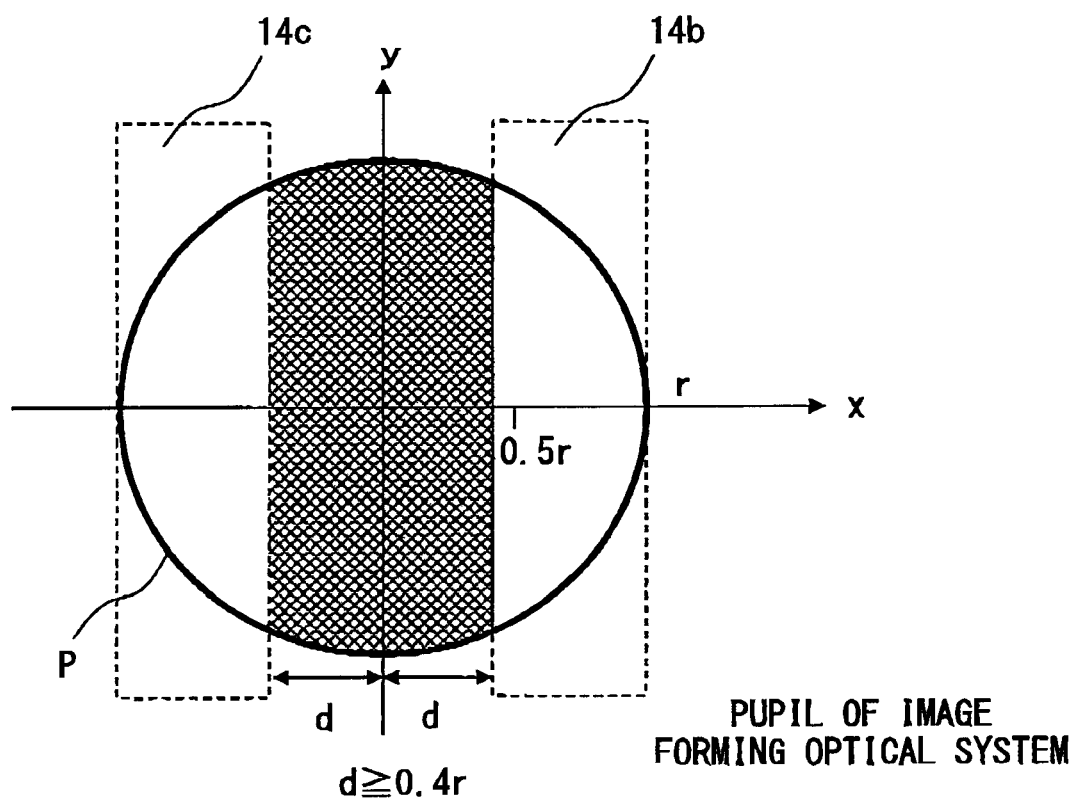
FIG. 23 is a top view of the pupil plane of an image forming optical system included in the microscope apparatus illustrated in FIG. 18.

More specifically, as illustrated in FIG. 23, the pupil of the image forming optical system 14 desirably meets the following conditional expression:

$$0.4 \leq d/r \quad (5)$$

where d denotes the distance between the center of the pupil P of the image forming optical system 14 and an aperture end of each of a plurality of aperture images (aperture images 14b and 14c) obtained by projecting the plurality of apertures (apertures 19a and 19b) of the oblique illumination section 19 at the pupil position of the image forming optical system 14, the aperture end being closest to the center of the pupil P (the aperture end is hereinafter referred to as an inner aperture end). That is, d denotes the distance between the center of the pupil P of the image forming optical system 14 and the position where light entering the image forming optical system 14 at a position closest to the center of the pupil P passes through the pupil P of the image forming optical system 14. Reference character r denotes the pupil radius of the image forming optical system 14.

Furthermore, if the aperture image has a small width (the length in the x direction in FIG. 23), high response performance is exhibited in a particular frequency region but fails to be obtained in a high frequency region. Hence, to visualize the microstructures in the cell (phase object) at a high resolution, the oblique illumination section 19 desirably includes apertures 19a and 19b with large slit widths.

More specifically, an aperture end of each of the aperture images 14b and 14c which is furthest from the pupil center (the aperture end is hereinafter referred to as an outer aperture end) is desirably formed at a distance equal to the pupil radius r from the center of the pupil P as illustrated in FIG. 23 or at a distance longer than the pupil radius r from the center of the pupil P.

As described above, if a phase object cultured in a culture vessel as illustrated in the present embodiment is observed, the oblique illumination section 19 desirably includes such an aperture with the inner aperture end positioned at least 0.4r (r denotes the pupil radius) away from the pupil center of the image forming optical system 14 and with the outer aperture end positioned at least r away from the pupil center of the image forming optical system 14. That is, the aperture is desirably positioned at a certain distance from the pupil center and shaped to avoid an excessively high aspect ratio. When the oblique illumination section includes such an aperture, even if a phase object cultured in a culture vessel is observed, a high contrast can be achieved both in contour images obtained by the oblique illumination and in phase distribution images obtained by the oblique illumination (diffracted images).

If a culture vessel is used to observe the phase object, it should be noted that the surface of the culture solution may be deformed into a concave surface under surface tension as illustrated in FIG. 19B. The concave surface of the culture solution acts on illumination light like a concave lens. Thus, in a phase contrast microscope, the concave surface disturbs the conjugate relationship between a ring slit in the illumination optical system and a phase plate in the image forming optical system. This in turn degrades phase distribution images. Such deformation is significant, in particular, in a multi-well plate with a small well diameter such as a multi-well plate with 96 wells. Hence, in an observation using a multi-well plate, it is difficult to obtain appropriate phase distribution images using a phase contrast microscope. In contrast, even if the surface of the culture solution is deformed into a concave surface, the microscope apparatus 80 according to the present embodiment can provide appropriate phase distribution images with possible degradation inhibited, as described below in detail.

In the microscope apparatus 80 according to the present embodiment, if the surface of the culture solution is concave, the apertures 19a and 19b of the oblique illumination section 19 are projected at the pupil position of the image forming optical system so as to be smaller in size than if the surface is flat. However, since the microscope apparatus 80 is designed so that the aperture image is projected on an area around the pupil as described above, with the reduced projection taken into account in advance, the apertures 19a and 19b may be formed in the oblique illumination section 19 so as to meet Expression (5) described above before and after the reduced projection.

Specifically, as illustrated in FIG. 24, the aperture 19a of the oblique illumination section 19 may be formed such that an aperture image 14d is projected on the pupil plane of the image forming optical system 14 if the surface of the culture solution is flat and that an aperture image 14e is projected on the pupil plane of the image forming optical system 14 if the surface of the culture solution is concave and if the aperture is projected so as to be reduced in size. When the aperture is thus formed so as to be projected so that the outer aperture end lies outside the pupil if the surface of the culture solution is flat, Expression (5) described above can be met even if the concave lens action causes the aperture image to shift toward the center of the pupil.

Furthermore, a mechanism for adjusting the shape of the aperture of the oblique illumination section 19 may be provided to adjust the shape of the aperture in accordance with the diameter of each well in the multi-well plate. Such a mechanism also allows Expression (5) described above to be met.

Moreover, in the microscope apparatus 80 according to the present embodiment, the concave lens action of the surface of the solution causes the aperture image to be projected at a position displaced from the pupil plane of the image forming optical system 14 in the direction of the optical axis. However, such displacement of the aperture image in the direction of the optical axis can be suppressed by configuring the oblique illumination section 19 so that the oblique illumination section 19 is movable in the direction of the optical axis.

The microscope apparatus configured to observe a phase object cultured in a culture vessel such as a multi-well plate is not limited to the microscope apparatus 80 according to the present embodiment. Similar observation can be achieved using any of the microscope apparatuses according to Embodiments 1 to 4. Furthermore, the conditional expression for the aperture image indicated by Expression (5) is desirably met not only for the observation of the phase object cultured in the culture vessel but also for the observation of other specimens such as slide specimens. The reason is as follows. In addition to the microstructures, structures with a gradually varying shape are present in the cell. Light diffracted by such structures is significantly affected by the MTF, like light refracted by the boundary surface of the phase object cultured in the culture vessel.

Furthermore, in Embodiments 1 to 5 described above, a transmission microscope is illustrated as an example of the microscope. However, the embodiments are not limited to the transmission microscope. The technique disclosed in the specification may be applied to, for example, an epi-illumination microscope. In particular, if the above-described metal is visualized, the technique is desirably applied to an epi-illumination microscope.

Additionally, in Embodiments 1 to 5 described above, the microscope is illustrated as an example of an apparatus for visualizing a phase object. However, the embodiments are not limited to the microscope. The technique disclosed in the specification may be applied to another type of apparatus, for example, an inspection apparatus; the technique may be applied to any visualization apparatus configured to visualize a phase object.

In addition, in Embodiments 1 to 5 described above, the rectangular aperture is illustrated. However, the embodiments are not limited to this shape. An aperture with any shape may be used, and for example, the aperture may be circular or trapezoidal. Alternatively, the aperture may be formed concentrically with respect to the optical axis.

What is claimed is:

1. A visualization method comprising:
   illuminating an observation target object in an oblique illumination to acquire a plurality of first electronic images of the observation target image illuminated from different illumination directions; and
   calculating the plurality of first electronic images to generate a second electronic image;
   wherein the observation target object is illuminated in an oblique illumination such that $0.4 \leq d/r$, where d denotes a distance between a pupil center of an image forming optical system and a position where light entering the image forming optical system at a position closest to the pupil center of the image forming optical system passes through a pupil of the image forming optical system, and r denotes a pupil radius of the image forming optical system.

2. The visualization method according to claim 1, wherein acquiring the plurality of first electronic images comprises:
   acquiring a first electronic image of the observation target image illuminated in an oblique illumination from a first illumination direction; and
   acquiring a first electronic image of the observation target image illuminated in an oblique illumination from a second illumination direction,
   wherein the first illumination direction and the second illumination direction are substantially symmetric with respect to an optical axis of an illumination optical system configured to illuminate the observation target object.

3. The visualization method according to claim 1, further comprising, before acquiring the plurality of first electronic images, displacing the observation target object, in a direction of an optical axis of the image forming optical system, from a focal position of the image forming optical system where an optical image of the observation target object is formed.

4. The visualization method according to claim 1, wherein generating the second electronic image comprises calculating a difference between the plurality of first electronic images.

5. The visualization method according to claim 1, wherein acquiring the plurality of first electronic images comprises:
   illuminating the observation target object in an oblique illumination from a first illumination direction;
   illuminating the observation target object in an oblique illumination from a second illumination direction;
   acquiring a first electronic image of the observation target object illuminated in an oblique illumination from the first illumination direction; and
   acquiring a first electronic image of the observation target object illuminated in an oblique illumination from the second illumination direction,
   wherein the first illumination direction and the second illumination direction are substantially symmetric with respect to an optical axis of an illumination optical system configured to illuminate the observation target object.

6. The visualization method according to claim 1, wherein acquiring the plurality of first electronic images comprises:
   illuminating the observation target object in an oblique illumination simultaneously from a first illumination direction and from a second illumination direction;
   acquiring a first electronic image of the observation target object illuminated in an oblique illumination from the first illumination direction; and
   acquiring a first electronic image of the observation target object illuminated in an oblique illumination from the second illumination direction, wherein the first illumination direction and the second illumination direction are substantially symmetric with respect to an optical axis of an illumination optical system configured to illuminate the observation target object.

7. A visualization apparatus comprising:
a light source;
an illumination optical system configured to guide light from the light source to an observation target object;
an image forming optical system configured to form an optical image of the observation target object on an image plane;
an image pickup element arranged on the image plane;
a calculation device configured to calculate a plurality of first electronic images of the observation target object obtained from the image pickup element to generate a second electronic image; and
an oblique illumination control section configured to control an illumination direction of oblique illumination provided by the illumination optical system,
wherein the plurality of first electronic images include first electronic images of the observation target object illuminated from different illumination directions by the oblique illumination control section;
wherein the oblique illumination control section comprises an oblique illumination section arranged near or at a pupil of the illumination optical system and comprising a plurality of apertures configured to define an illumination angle of the oblique illumination; and
wherein $0.4 \leq s$ d/r, where d denotes a distance between a pupil center of the image forming optical system and an aperture end of each of a plurality of aperture images obtained by projecting the plurality of apertures at a pupil position of the image forming optical system, the aperture end being closest to the pupil center, and r denotes a pupil radius of the image forming optical system.

8. The visualization apparatus according to claim 7, wherein the plurality of first electronic images include:
a first electronic image of the observation target image illuminated from a first illumination direction; and
a first electronic image of the observation target image illuminated from a second illumination direction,
wherein the first illumination direction and the second illumination direction are substantially symmetric with respect to an optical axis of the illumination optical system.

9. The visualization apparatus according to claim 7, wherein the image forming optical system is arranged in such a manner that a focal position of the image forming optical system is displaced from the observation target object.

10. The visualization apparatus according to claim 7, wherein the calculation device calculates a difference between the plurality of first electronic images to generate the second electronic image.

11. The visualization apparatus according to claim 7, wherein the oblique illumination control section further comprises:
a first polarizer arranged over a first one of the plurality of apertures to allow light in a first polarizing direction to pass through;
a second polarizer arranged over a second one of the plurality of apertures to allow light in a second polarizing direction orthogonal to the first polarizing direction to pass through; and
a polarizing direction control section arranged between the light source and both the first polarizer and the second polarizer to control the polarizing direction of light,
wherein the first polarizer and the second polarizer are arranged substantially symmetrically with respect to an optical axis of the illumination optical system.

12. The visualization apparatus according to claim 7, wherein the plurality of apertures comprises at least a first aperture and a second aperture, and the first aperture and the second aperture are arranged substantially symmetrically with respect to an optical axis of the illumination optical system, and
wherein the light source comprises:
a first light source configured to illuminate the first aperture; and
a second light source configured to illuminate the second aperture.

13. The visualization apparatus according to claim 7, wherein the oblique illumination control section further comprises:
a first optical filter arranged over a first one of the plurality of apertures to allow light in a first wavelength region to pass through; and
a second optical filter arranged over a second one of the plurality of apertures to allow light in a second wavelength region different from the first wavelength region to pass through,
the first optical filter and the second optical filter are arranged substantially symmetrically with respect to an optical axis of the illumination optical system, and
the image pickup element comprises:
a plurality of first-pixels configured to detect the light in the first wavelength region; and
a plurality of second pixels configured to detect the light in the second wavelength region.

14. The visualization apparatus according to claim 7, wherein the oblique illumination control section further comprises:
a first polarizer arranged over a first one of the plurality of apertures to allow light in a first polarizing direction to pass through; and
a second polarizer arranged over a second one of the plurality of apertures to allow light in a second polarizing direction orthogonal to the first polarizing direction to pass through;
wherein the first polarizer and the second polarizer are arranged substantially symmetrically with respect to an optical axis of the illumination optical system, and
the image pickup element comprises:
a plurality of first pixels configured to detect the light in the first polarizing direction; and
a plurality of second pixels configured to detect the light in the second polarizing direction.

15. The visualization apparatus according to claim 7, further comprising a display device configured to display the second electronic image generated by the calculation device.

* * * * *